June 9, 1936.　　　H. A. FOOTHORAP　　　2,043,581
COLLATING MEANS
Filed Oct. 23, 1934　　　16 Sheets-Sheet 1

Inventor
Harry A. Foothorap
By L. G. Julihn
Attorney

Harry A. Foothorap.

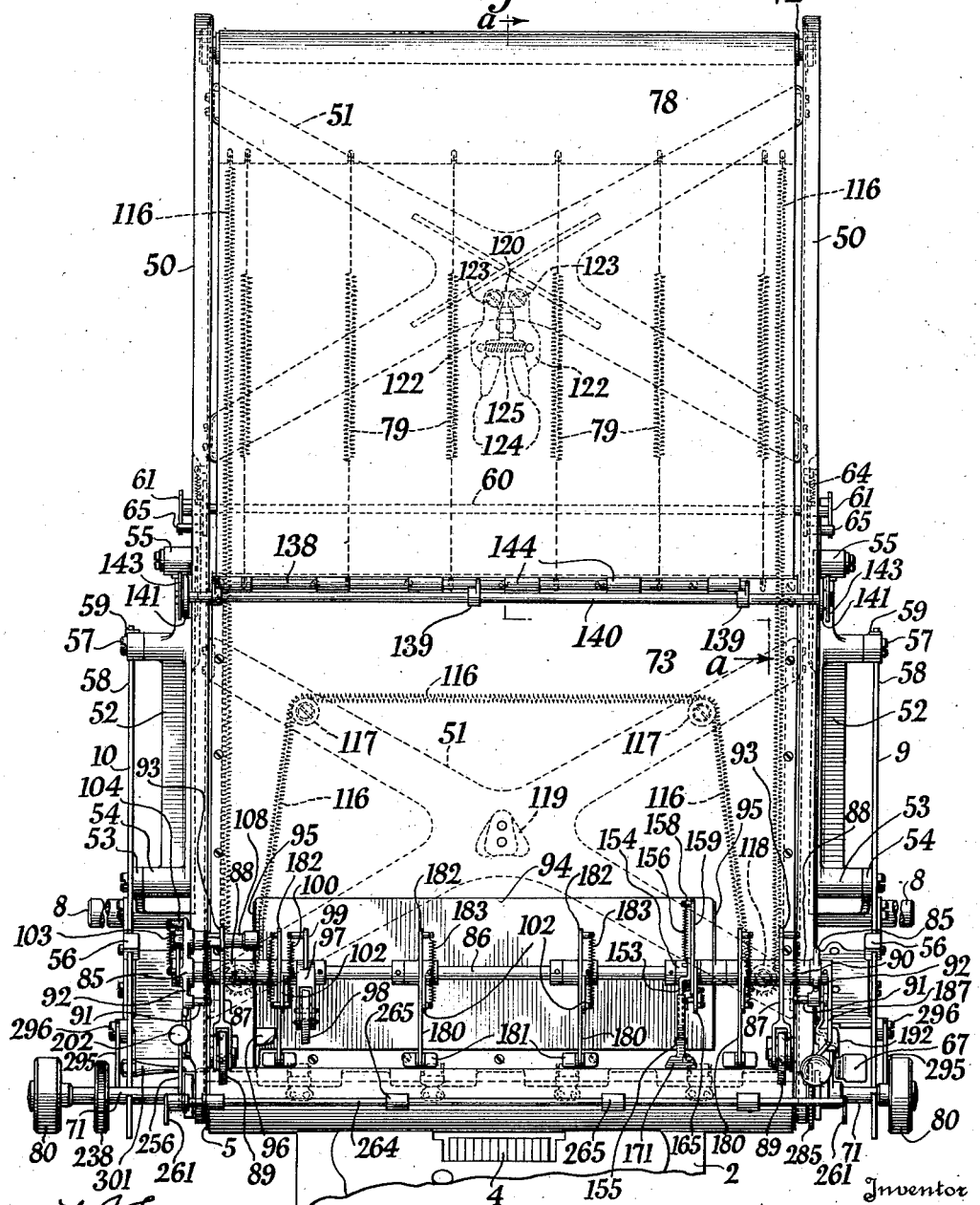

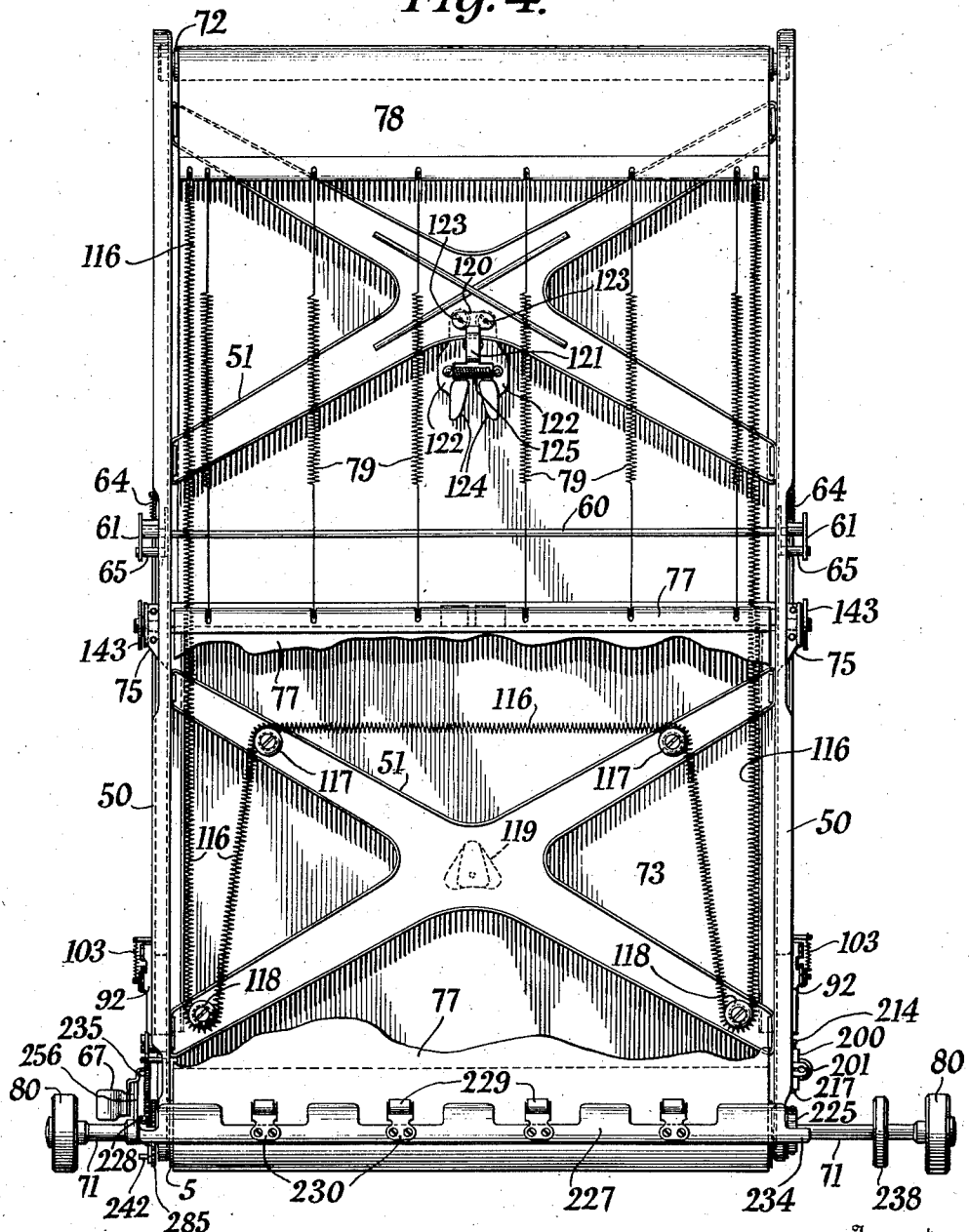

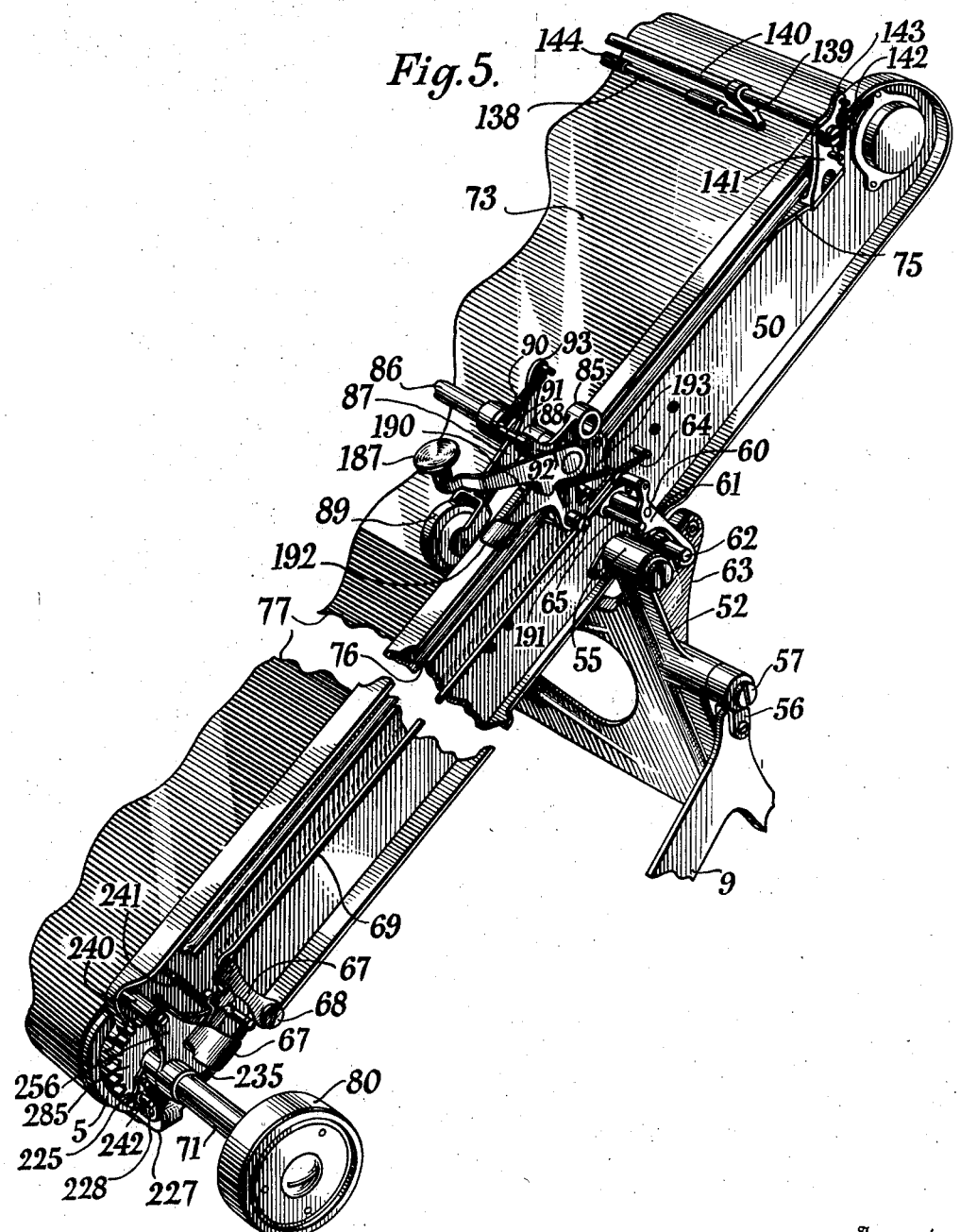

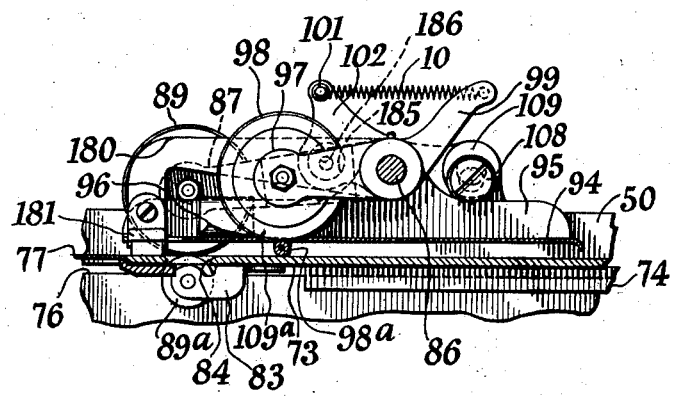

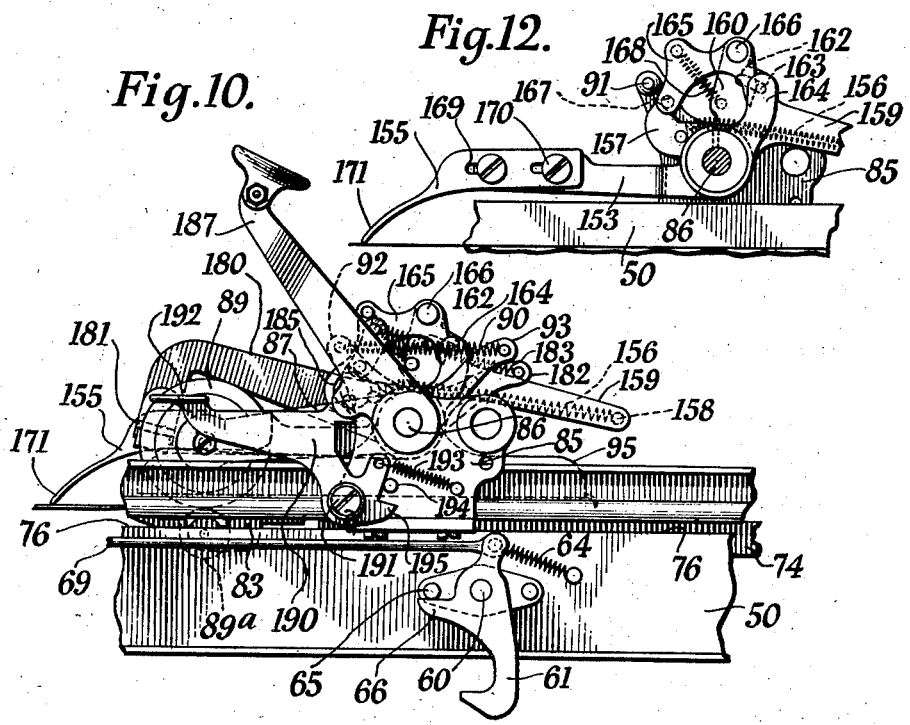
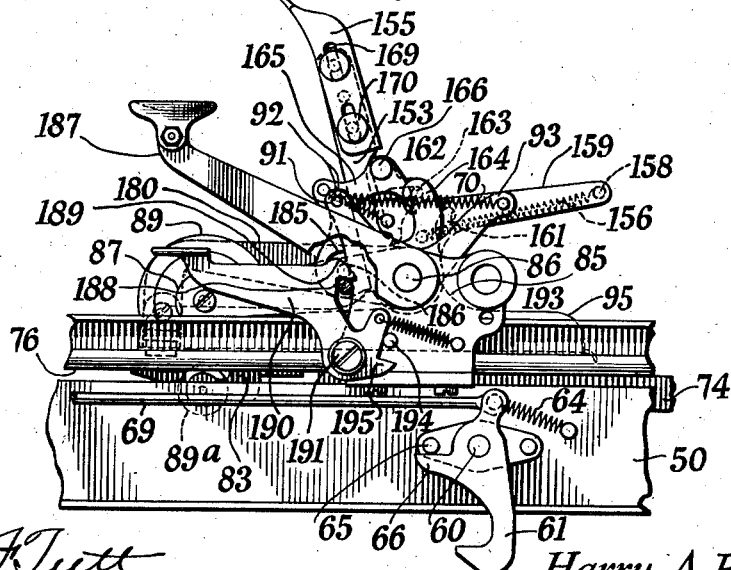

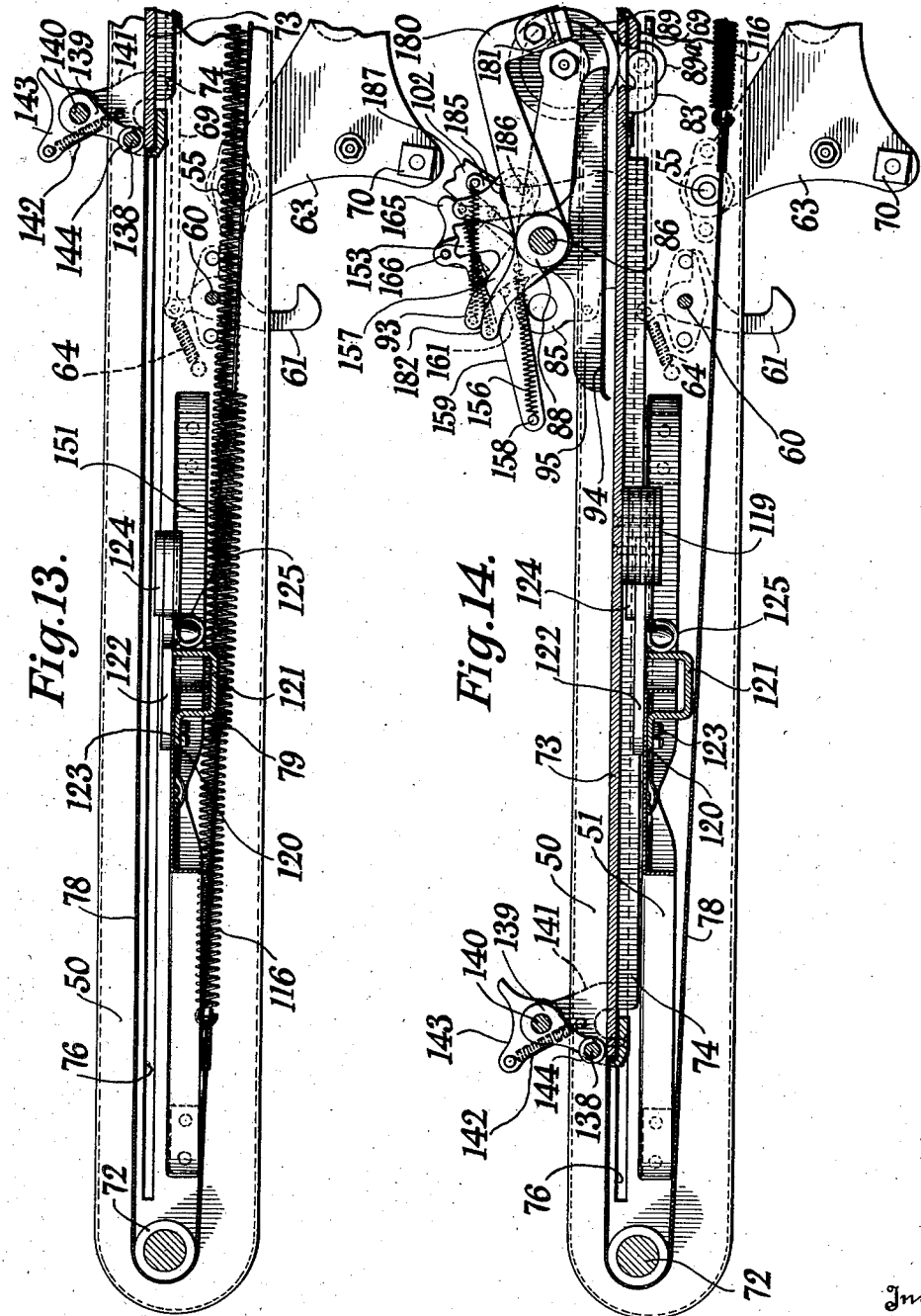

June 9, 1936.  H. A. FOOTHORAP  2,043,581
COLLATING MEANS
Filed Oct. 23, 1934  16 Sheets-Sheet 9
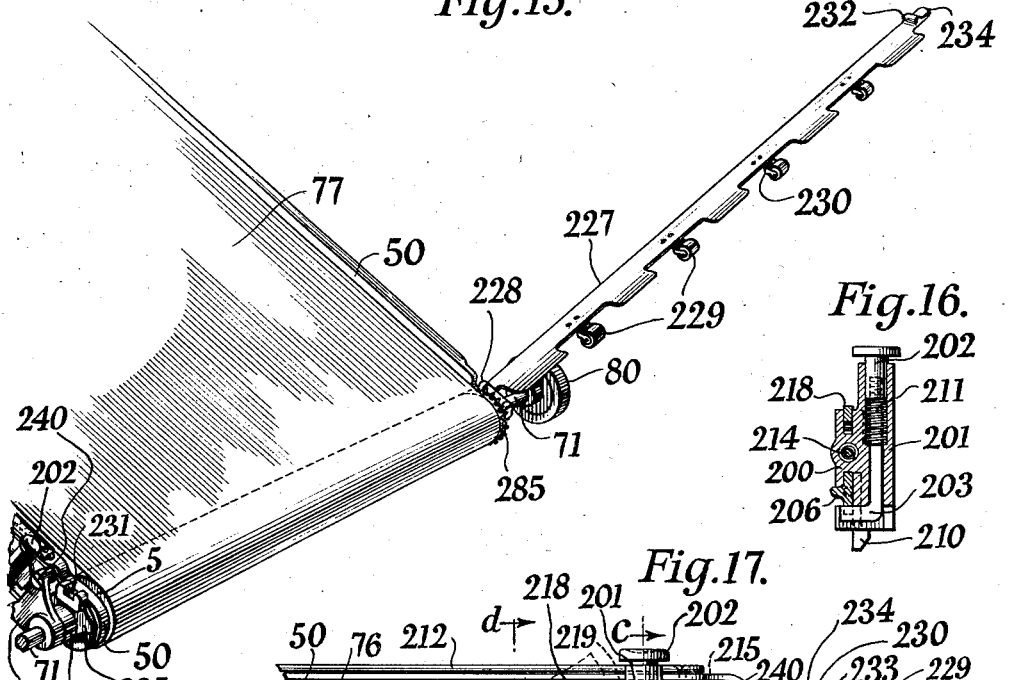
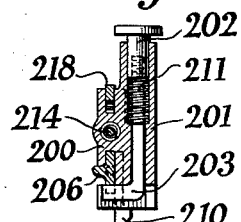
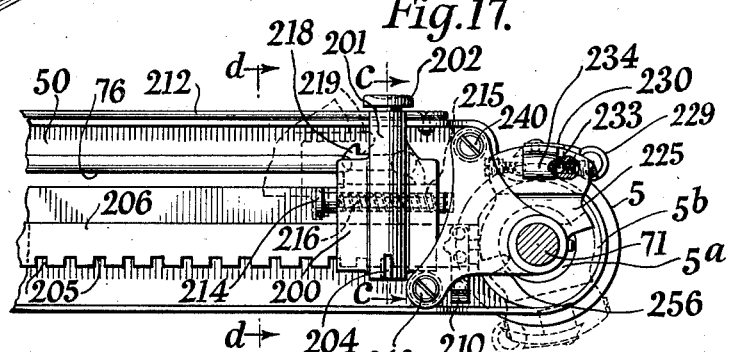
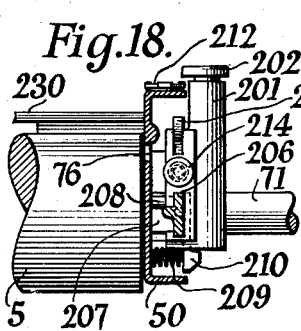
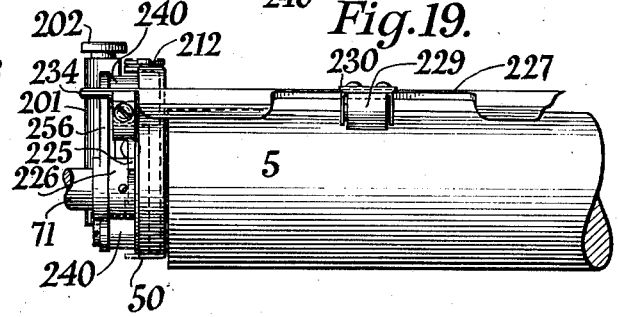
Inventor
Harry A. Foothorap.
By L. G. Julihn
Attorney

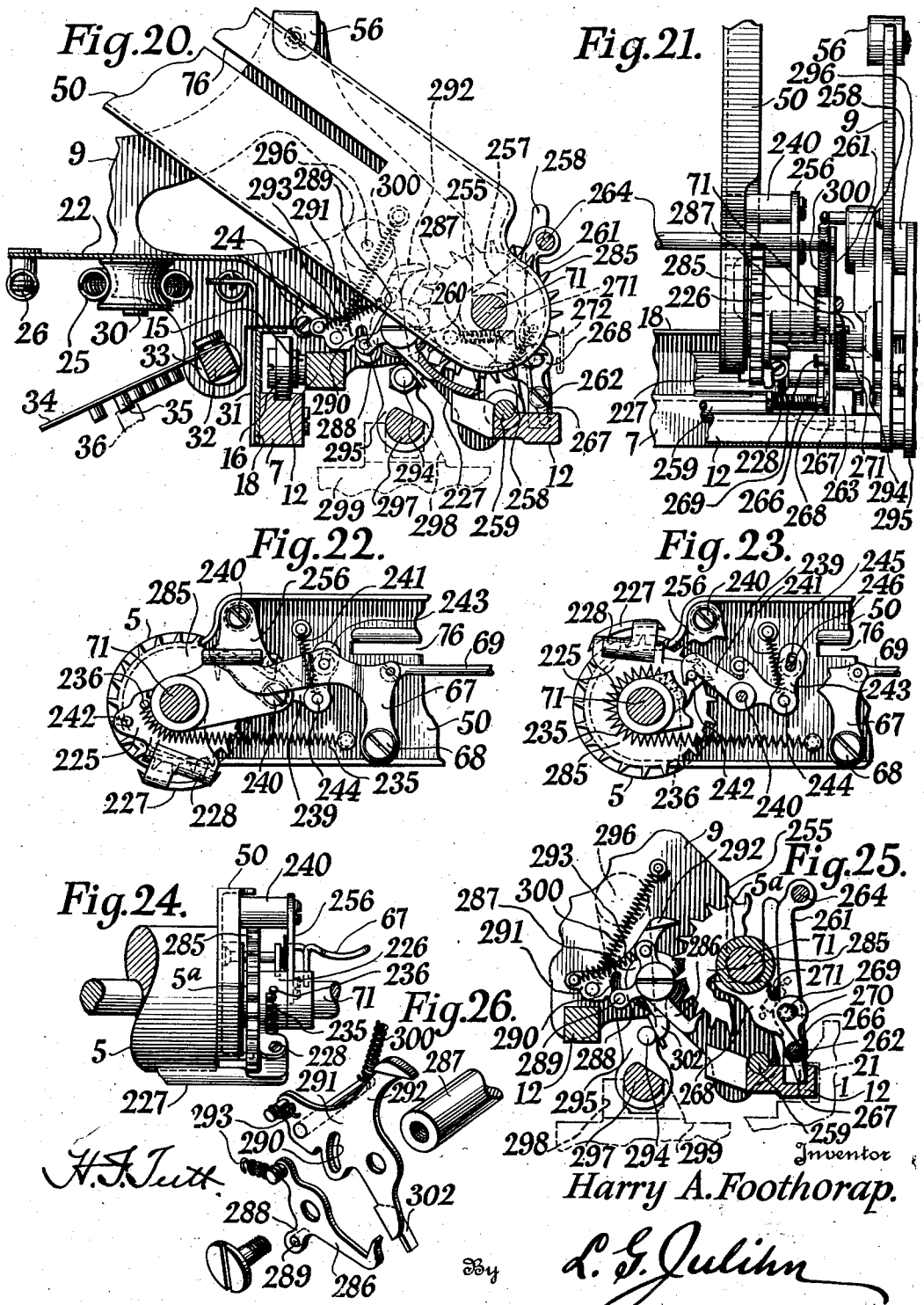

June 9, 1936.  H. A. FOOTHORAP  2,043,581
COLLATING MEANS
Filed Oct. 23, 1934   16 Sheets-Sheet 11
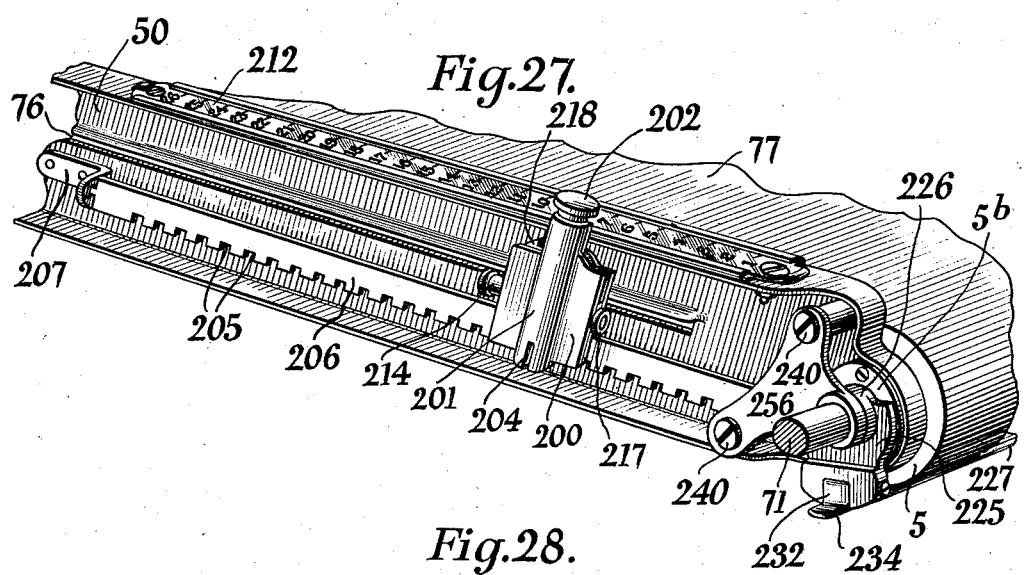
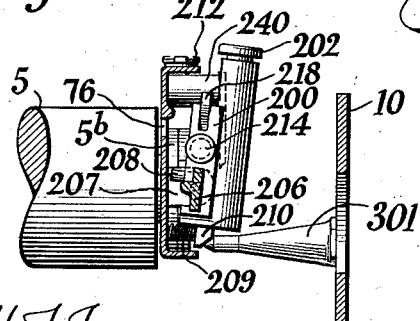
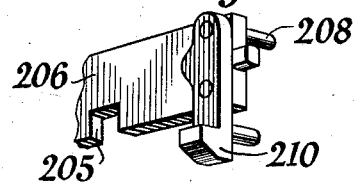
Inventor
Harry A. Foothorap.
By L. G. Julihn
Attorney June 9, 1936.  H. A. FOOTHORAP  2,043,581
COLLATING MEANS
Filed Oct. 23, 1934  16 Sheets-Sheet 13

Inventor
Harry A. Foothorap.

June 9, 1936.  H. A. FOOTHORAP  2,043,581
COLLATING MEANS
Filed Oct. 23, 1934  16 Sheets-Sheet 16

Inventor
Harry A. Foothorap.

Patented June 9, 1936

2,043,581

UNITED STATES PATENT OFFICE 2,043,581

COLLATING MEANS

Harry A. Foothorap, Harrisburg, Pa., assignor to Underwood Elliott Fisher Company, New York, N. Y., a corporation of Delaware Application October 23, 1934, Serial No. 749,611

76 Claims. (Cl. 197—126)

This invention is more particularly directed to means to enable the speedy and accurate collation of forms designed for use in connection with cylindrical platen machines; the semi-automatic positioning of such forms, when collated, opposite the printing means; and the displacement of such forms, while still in collated arrangement, from printing position to collating position for removal or substitution.

The invention is adapted for attachment, with such potentially immaterial structural changes as may be necessitated by the differences in commercial shapes, to adding and calculating machines, and to typewriting machines equipped with rotatable platens.

The prior art, and in particular, the Wherry United States Patents, Nos. 1,320,593, dated November 4, 1919, reissued as No. 15,537, February 13, 1923; 1,351,081, dated August 31, 1920, reissued as No. 15,426, July 25, 1922; and 1,415,750, dated May 9, 1922, disclose the idea, broadly, of providing a flat collating table pivotally connected with the paper carriage of a typewriting machine to travel back and forth therewith in letter spacing direction and return.

Such patents also show the usual rotatable platen of a typewriting machine mounted in the forward end of a floating collating table, so as to be swung therewith upwardly and forwardly from printing position, wherein the collating table occupies a substantially vertical position, to the collating position, wherein the table assumes a substantially horizontal position, to enable the collation thereon of the work sheets interleaved with a transfer material, as the well-known carbon paper.

Furthermore, such patents disclose the provision of a counter-balanced clamping means slidably mounted on the collating table for travel lengthwise thereof, the work sheets and transfer material being first properly interleaved and relatively positioned on the collating table when the latter is in its substantially horizontal position, after which the clamping means is applied to retain the sheets in their assembled or collated positions.

It is then necessary, in the prior art disclosure, to introduce the bottom ends of the sheaf of collated sheets into the discharge end of the throat formed between the periphery of the platen and a concentric apron or paper chute supported to lie adjacent the platen at all times, and after effecting such introduction, to feed the sheaf of collated sheets backwardly around the platen until the desired writing line is brought to the printing line of the machine.

In attaining this result, the heavy clamp attached to and holding the upper edges of the sheets together, is drawn along with the sheaf of sheets as the latter is fed backwardly, against the inertia of the counter-balancing means.

The line or lines of writing having been completed, the operator may grasp the upper edges of the sheets forming the sheaf, or the clamp, to manually draw the sheaf of sheets upwardly along the collating table while the latter is in the writing position. Or the table may be swung to its collating position and the sheaf of sheets manually pulled rearwardly with the clamp to withdraw the sheaf from around the platen, after which the clamp is unfastened. The sheets to be distributed are then removed, the sheets relating to the next account collated, with the auditing or ledger sheet which remains in place on the table, the clamp reapplied to such second sheaf of sheets, and the procedure heretofore explained is repeated.

The present invention is an improvement over the devices of the prior art.

One object of the present invention is to improve and simplify such devices to the ends, First, that the assembling or collating of superposed work sheets on the collating table and the interleaving of transfer material therewith, prior to the printing operation, may be effected more readily, quickly, and easily than heretofore;

Second, that the conveyance of the collated work sheets to, and their displacement from printing position may be effected with greater rapidity and accuracy, and with the assurance that the sheets will remain in their relatively adjusted positions, not only during conveyance to and from the printing point, but also as the collated sheets are advanced in line-spacing and letter-spacing operations while in printing position;

Third, that the removal of work sheets from, and the substitution of other work sheets on, the collating table may be facilitated.

For example, in the prior art, a plurality of opposed parallel linkages connect the collating table with the paper carriage or traveling member, which linkages materially restrict, as well as impede, the shifting of the collating table and platen from printing position to collating position, and return, rendering such movement jerky and uneven, unless the operator is careful to move the table according to the arcs of travel permitted by the system of parallel linkages, and there exists the possibility of the table binding or cramping during such movements.

Another object of this invention is the provision of a swinging support for the floating collating table so designed as to eliminate the danger of the table binding or cramping during its adjustment from collating to printing position, and vice versa, and permitting a greater ease and rapidity of adjustment.

As one such means to accomplish this result, I provide a single support pivotally mounted on the paper carriage to travel therewith transversely of the machine, and itself adapted to rock in fore and aft relation to the machine, between suitably determined limits so as to variously support the table in collating position with its forward platen-carrying end either close to or back from the operator, whereby to enable the latter to perform the collation of the work sheets in such position as is the most efficient and comfortable to the individual.

The type of supporting means used in this invention enables the collating table to occupy a collating position much closer to the operator than in related structures of the prior art, thereby facilitating the work of the operator, without necessitating stretching the arms unduly, or leaving one's seat. This is of particular advantage when the invention is applied to adding and calculating machines having projecting key-boards, as the full or 81-key type of machines, since it renders the arrangement and handling of the work sheets much easier and quicker than heretofore.

The invention is applicable to the travelling carriages of typewriting, adding and calculating machines, equipped for either manual or automatic tabulation, and automatic return.

If applied to adding and calculating machines equipped with multiple totalizers, a control or segregation of the postings either automatically or by depression of keys may be had, and for illustration, the invention is shown applied to the automatic tabulating and return carriage of the well-known motor-driven Sundstrand multiple totalizer machine equipped with carriage control of machine functions, it being understood that the use of the invention is not restricted to this type of machine.

Still another object of the invention is to releasably retain the collating table in fixed position relatively to its support, during the arrangement of the work sheets thereon, so as to positively hold the flat loading surface at a convenient angle to facilitate the removal of the printed sheets therefrom and the collation of new sheets thereon.

A further object is the provision of one or more continuous carbon or transfer webs mounted on and traveling in fixed relation with the carriage, the collating table being shiftable on its pivotal support and relatively to the transfer supply which can be paid out from time to time as required to supercede old and used transfer surfaces with new and unused reaches of the carbon web or webs.

The used portions of the transfer material, if carbon paper, may be easily severed from the supply from time to time.

The supply of transfer material is preferably mounted on the paper carriage, apart from the collating table, to relieve the collating table of the weight of such transfer material and to keep such transfer material out of the way of the collating table as the latter is shifted from its printing to its loading or collating position, and vice versa.

Co-related with the foregoing object is the retention of the reach of web in use on the collating table against displacement relatively to the table as the latter is shifted from its collating to its printing position and vice versa, the retaining means being releasable to enable an additional reach to be paid out from the supply and drawn onto the table as required, means also being provided to prevent the formation of an excess amount of slack in the web, due to the accidental unwinding of the supply.

The means employed to effect these results also acts to preserve sufficient slack in the carbon webs between the supply and the collating table to enable adjustment of the table to its various positions without damage to or the imposition of strain upon the transfer material.

Still another object is the improvement of the collating means in such manner as to facilitate the insertion of the work sheets relatively to each other, and the interleaving of the work sheets with the transfer webs in a novel manner, and in this connection, a further object is to automatically position the work sheets in their proper superimposed relation as an incident to their alignment.

As one means to effect these results, separate guides on the collating table confine the respective work sheets to predetermined paths of travel, along which the sheets are projected in the process of collation, by manually operable sheet-adjusting rolls individual to the respective sheets and of such conformation as to act in combination with the guides to direct the sheets to, and maintain them in their proper paths. In addition, a separate guide and a manually-operable collating feed roll are provided for properly locating the statement sheet, in similar manner.

Heretofore, it has been customary to provide a clamping member extending across the collating table, the collated work sheets and interleaved transfer material being confined between the jaws of the clamping member, with such pressure as to often cause the transfer material to smudge the lower work sheets over an area corresponding to the length and width of the clamping bar.

In some instances, apparently to overcome any tendency for relative movement due to the possible strain on the work sheets and transfer material, the clamping bar also carried pins adapted to penetrate the several layers of work sheets and transfer material, to insure the retention of the sheets in collated position, but with a consequent mutilation of the sheets.

In an endeavor to avoid the above disadvantages, the present invention includes a series of individually formed presser feet which do not mutilate the sheets or the transfer material, and reduce the liability of smudging the sheets.

Sharp impact of the presser feet against the collated sheaf of sheets and interleaved transfer material would tend to form smudge marks on the lower work sheets, to avoid which, the present invention arranges to first apply the presser feet gently upon the sheaf of sheets, and after contact of the presser feet and work sheets is established, pressure is applied to the presser feet to cause them to hold the sheets in collated position.

Another object of this invention is to enable the operator to more quickly and easily collate the work sheets on the table with reference to the first blank writing line on the sheets, and facilitate the registration of the writing line on the paper with the printing line of the machine.

In the present invention, this object is attained by providing a line locator which, when in effective position, contacts the upper, or statement sheet to indicate thereon the point at which the types will print when the sheaf of sheets has been positioned around the platen and the latter seated in printing position in the carriage.

The line locator may be of such width as to also directly indicate the point at which the types will print on the ledger and proof sheets as well.

Another object of the invention is to simplify the collating operation as much as possible, to which end, provision is made to effect the displacement to idle position of the line locator automatically, thus relieving the operator from having to remember to attend to this detail.

As one means to effect this result, the line locator is placed under control of the sheet clamping means so that when the latter is rendered effective, the line locator is thereby released and shifted to its ineffective position.

In the prior art heretofore referred to, the work sheets are threaded through a counter-balanced paper clamp extending across the upper face of the collating table, mounted to slide towards and from the platen. After the manual collation of the sheets, the clamp is rendered effective and then manually slid towards the platen, together with the collated papers, so as to advance the pack of collated sheets bottom ends first towards a throat formed between a platen and the forward end of the paper apron.

It is then necessary for the operator to use one hand to so manipulate the bottom edges of the collated sheets as they arrive at this throat that they shall enter the passageway between the periphery of the platen and the inner concave face of the paper chute, and curl around the platen, the bottom ends of the sheets passing out behind the platen through the opening into which the leading-in ends are usually introduced in straight typing operations.

In backwardly feeding the collated work sheets around the platen according to the prior art, to bring the first writing line to juxtaposition relatively to the printing line, it is necessary to reversely rotate the platen, and since the counter-weighted clamp is attached to the sheaf of sheets, the pressure exerted by the feed rolls mounted in the paper apron, against the sheaf of work sheets must be sufficient to overcome the weight of the clamp.

This necessitates the exertion of an unusually heavy pressure by the feed rolls against the paper, to enable a strong pull to be applied to the sheets so as to drag the counter-balanced clamp along.

An object of the present invention is to greatly facilitate the operation of fitting the collated sheaf of work sheets around the platen and aligning the first writing line with the printing line, such aligning being effected incident to the operation of fitting the work sheets around the platen, and without necessitating attention on the part of the operator.

In effecting these objects, this invention automatically wraps the sheaf of sheets snugly around the platen preparatory to seating the platen in printing position, thereby obviating the necessity for the slow and careful introduction of the bottom edges of the sheets, which often extend different distances, into a comparatively narrow paper throat, and the reverse rotation of the platen manually to feed the sheaf of sheets backwardly around the platen, as heretofore.

Furthermore, the work sheets having been previously collated with regard to the indication afforded by the line locator, the automatic wrapping or fitting of the sheaf of work sheets around the platen incidentally locates the first blank line of writing on the sheets at the printing line of the types, thus entirely eliminating any necessity for turning the platen back and forth to effect this desired positioning.

Indeed, such positioning so naturally and invariably follows as a result of the preliminary adjustments, that in the particular form of the invention herein shown, the finger knobs by which the operator heretofore has adjusted the paper to bring the line of writing to the line of print, are deprived of this function and exercise no control over the rotation of the platen.

Another object of this invention is to combine a presser roll mechanism with the paper-wrapping device, or conversely stated, to provide an automatic wrapping device with presser roll mechanism to enable the wrapping device to also take or iron out the slack as the collated sheets are wrapped around the platen, and to hold the sheaf of work sheets smoothly and snugly against the platen to prevent wrinkling.

A further object is to arrange for the automatic operation of an upper presser roll mechanism, which maintains the paper fitted against the platen at a point some distance above the printing line.

This result is conveniently effected by placing the upper presser roll mechanism under control of the collating table so that by setting the platen in its seat, the upper pressure roll mechanism is rendered effective, and by dislodging the platen from its seat, the upper presser roll mechanism is released for movement out of the path of the platen.

Still another object is the provision of novel means to protect the exposed surfaces of the sheaf of work sheets against smudging by contact with the ribbon, which, in the present instance, is effected by a suitably located guard plate to co-act with the work sheets and confine them against bulging outwardly from the periphery of the platen at points between the respective series of presser rolls.

Another object is to guide the bottom edges of the work sheets rearwardly and substantially horizontally as the platen and collating table with the sheets wrapped about the platen, are brought to printing position, to avoid crumpling or wrinkling the paper and to prevent its entry into the space reserved for the operating parts of the machine, with consequent damage.

Still another object is the provision of novel motor-driven line space feeding means for the sheaf of sheets, which may operate conveniently, though not necessarily, on the escapement principle.

A still further object of the invention is to provide novel and efficient means to positively retain the platen and collating table in printing position against the possibility of unintentional displacement.

This result is attained by the provision of locking means automatically effective to engage the platen and table as they are brought to printing position in the act of seating the platen in its carriage.

Still another object is to relieve the operator of the work of returning the sheaf of sheets to collating position upon the completion of the writing operation and preliminary to the removal of the printed statement and ledger sheets and the substitution of others, and to reduce the time intervening between actual printing operations.

To this end, the line space motor is utilized to automatically restore the collating truck and its sheaf of sheets to collating position incident to the intentional release of the means which locks the platen and collating table in printing position.

To these and other ends, the invention includes many novel features and combinations of parts, which, together with other objects and advantages, will more fully appear hereinafter and be particularly pointed out in the claims.

In the accompanying drawings:

Figure 3 is a plan view of the table in printing position;

Figure 4 is a bottom plan view of the table, partly broken away to show the sheaf-retracting and line-spacing motor;

Figure 5 is a fragmentary perspective view of the right side of the table when in its forward collating position;

Figure 6 is a detail fragmentary view in right side elevation, partly in section, showing adjacent manually operable collating and sheet positioning rolls, and a paper clamping foot in effective position;

Figures 7 and 8 are fragmentary detail front and rear views of the same;

Figure 9 is a fragmentary perspective detail of the same collating rolls, clamping foot and guide;

Figure 10 is a fragmentary detail in right side elevation, showing the printing line locator in effective position, and a paper clamp together with its control lever in idle position;

Figure 11 is a similar view, showing the same parts in their reversed positions, the control lever being locked in its adjusted position to maintain the paper clamp effective;

Figure 12 is a detail side view, showing the line locator, the catch which retains the line locator effective, and the catch-releasing means;

Figure 13 is a longitudinal sectional view on line a—a of Figure 3, of the upper or rear end of the collating table, to show the support and tensioning means, and the flexible portion of the conveyor, the parts being shown with the conveyor in its forward position;

Figure 14 is a similar view, showing the conveyor in its normal retracted position;

Figure 15 is a fragmentary perspective view of the forward end of the collating table, showing the automatic sheet-wrapping bail thrown back preparatory to shifting the collated sheaf of work sheets to its advanced position;

Figure 16 is a detail vertical sectional view on line c—c of Figure 17, showing the adjustable stop which arrests the sheet-clamping mechanism and the sheaf of collated sheets at the desired point in the advance of the sheaf of sheets, preparatory to wrapping the collated sheets around the platen;

Figure 17 is a detail side elevation of the left-hand forward end of the collating table, showing the adjustable stop;

Figure 18 is a vertical sectional view on line d—d of Figure 17, through the left-hand side rail of the collating table, to show details of the adjustable stop and its support;

Figure 19 is a detail fragmentary front view of the left-hand end of the collating table and platen, to show the sheet wrapping bail in latched position, preparatory to wrapping the collated sheets around the platen;

Figure 20 is a fragmentary detail sectional view of the front end of the collating table in printing position, to show the line space escapement mechanism;

Figure 21 is a fragmentary top plan view of the right-hand front end of the collating table;

Figure 22 is a fragmentary side view of the right front end of the collating table, to show the normal position of the sheet-wrapping bail;

Figure 23 is a similar view, showing the sheet-wrapping bail latched in its cocked position, preparatory to wrapping the bottom ends of the work sheets around the platen;

Figure 24 is a fragmentary front view of the right-hand end of the collating table, with the parts in the positions shown in Figure 22;

Figure 25 is a detail side view, partly in section, showing the line spacing or escapement control mechanism for the collated sheets, the table being in its printing position;

Figure 26 is a disassembled perspective view, showing the line space escapement dog and pawl;

Figure 27 is a fragmentary perspective view of the left-hand front end of the collating table, disclosing the adjustable stop for the traveling truck to which the sheaf of sheets, when collated, is clamped;

Figure 28 is a detail perspective view of the buffer or brake mechanism which cushions the return of the traveling truck to its initial position;

Figure 29 is a detail sectional view, showing the automatic displacement of the adjustable stop and its latch, to release the traveling truck to the action of its restoring and line spacing motor;

Figure 30 is a detail perspective view of the cam with which the tappet co-acts to effect the automatic release of the traveling truck;

Figure 1:
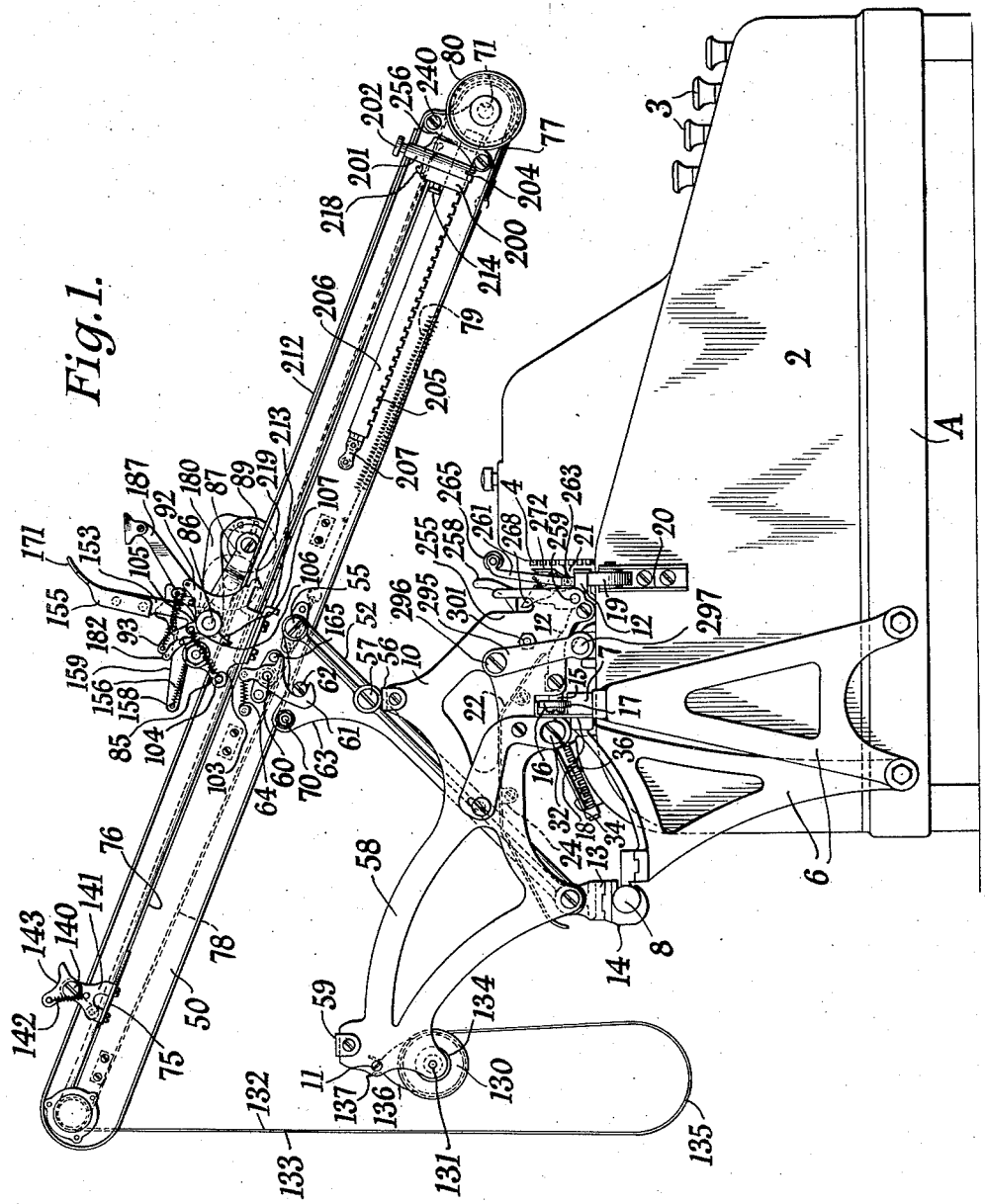
Figure 1 is a left side elevation, showing one embodiment of the invention applied, for illustrative purposes, to the well-known Sundstrand calculating machine, the table being shown in its forward collating position.

This embodiment of the invention is illustrated in connection with the well-known Sundstrand adding machine, disclosed, for instance, in U. S. Letters Patent, No. 1,198,487, issued September 19, 1916, which includes a base A (Figs. 1, 2, 32, 37, 38, and 39), on which rest side frames 1 (one being indicated in Fig. 25) for the support of the registering mechanism enclosed within a casing 2 and forming no part of the present invention.

The keys 3 (Figs. 1 and 36) of a keyboard embraced between the forward ends of the side frames, when depressed, control the amount to be registered on the customary totalizer wheels (not shown). These amounts are printed by types 4 (Figs. 1 and 2) mounted in type bars vertically adjustable in front of a platen 5. (Figs. 3–5, 18 and 19), against which the types are driven by denominational hammers (not shown) in the usual manner.

Outwardly curved brackets 6, (Figs. 1 and 2), secured at their lower ends to opposite sides of the base A of the machine, support at their upper outer ends a pair of parallel front and rear tracks 7 and 8, extending transversely of the machine, the rear track or carriage way rod 8 overhanging the rear end of the machine, in this instance, so as to afford in conjunction with the front track, a broad firm bearing for a tabulating carriage frame, the tracks extending some distance beyond the sides of the machine to support the carriage for columnar adjustment.

The front track 7, as usual, is fastened to the upper edges of the side frames 1, in a manner not shown, as it forms no part of the present invention.

Figure 31:
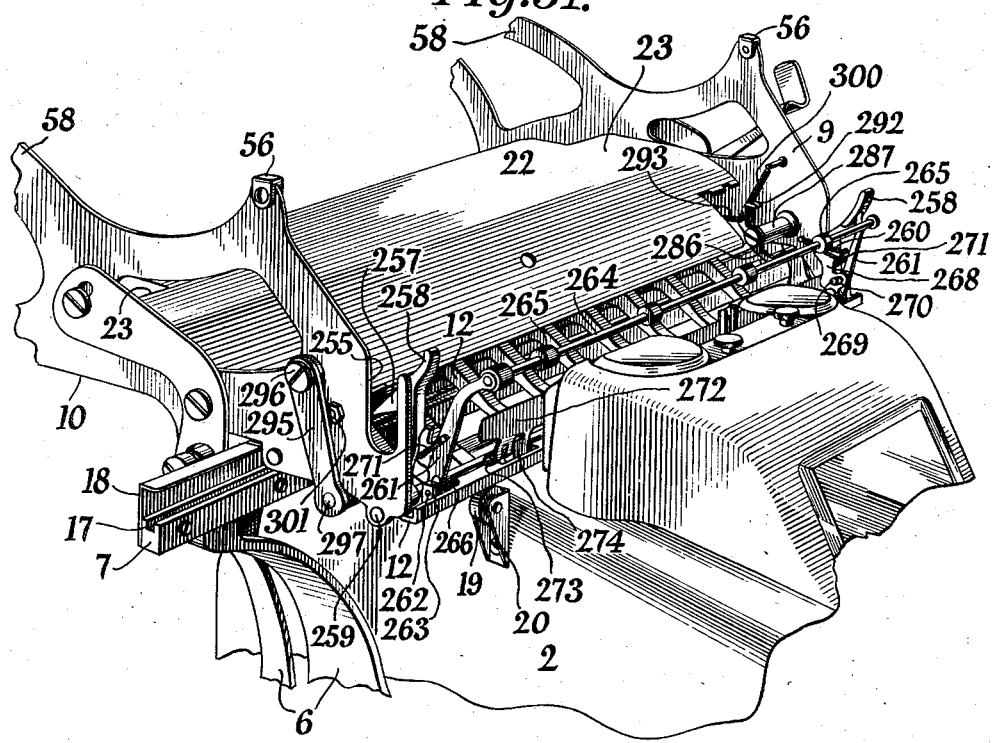
Figure 31 is a perspective view of a Sundstrand calculating machine having mounted thereon a traveling paper carriage, partly broken away, the collating table being omitted to better disclose the paper guards, upper pressure roll bail and ribbon guard plate.
Figure 32:
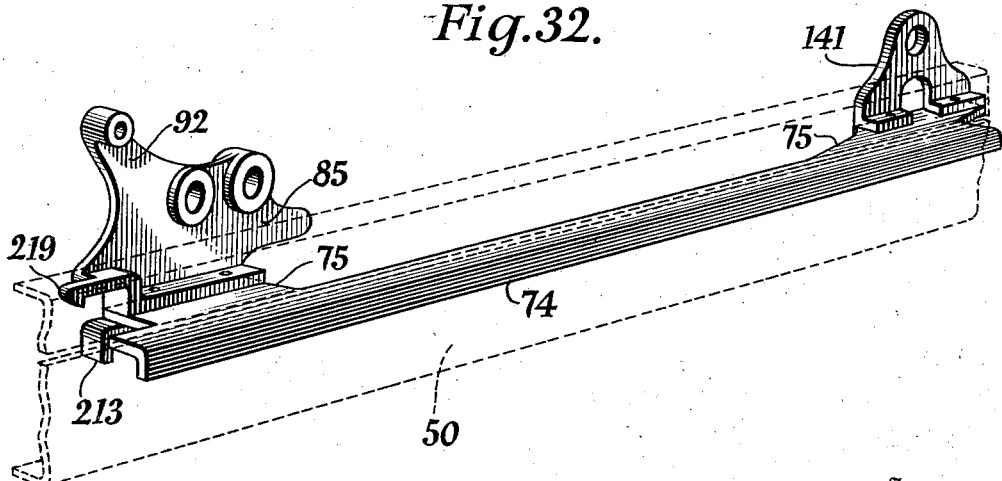
Figure 32 is a perspective detail view of a side bar of the traveling truck and its relation to the adjacent side rail (in dotted lines) of the collating table.

The skeletonized right and left side frames 9 and 10, (Figs. 1–3 and 31), of the carriage are connected at their rear ends by a stay rod 11 and at their forward ends, by an inclined paper guiding grid 12, (Figs. 1, 25, and 31), a tie beam 13 (Figs. 1 and 2) connecting the end frames at points intermediate the stay rod and grid, the whole comprising a rigid well-braced carriage structure capable of supporting considerable weight without flexing.

Carriage frame bearings 14 of the usual form, depend from the tie beam 13 to embrace and slide along the rear track or carriage way rod 8.

Studs 15 projecting rearwardly from the rearmost longitudinal bar of the grid 12 (Figs. 1, 2, and 20) carry rolls 16 adapted to traverse a groove 17 formed longitudinally of the upper face of the front track 7, the rolls being held in place by a flanged guard plate 18 secured at its lower edge to the rear face of the track 7.

The lower face of the foremost longitudinal bar of the grid 12 rides upon and is supported by rolls 19 journaled in brackets 20 mounted in any convenient manner, as on opposite sides of the casing 2 of the machine, and the front edge of the foremost longitudinal bar of the grid enters and is confined in guide slots 21 (Fig. 25) formed in the respective side frames 1 of the machine.

From the foregoing it will be seen that the carriage, including the end frames 9 and 10, the stay rod 11, the grid 12 and tie beam 13, is slidable transversely of the machine on the front and rear tracks 7 and 8.

Figure 33:
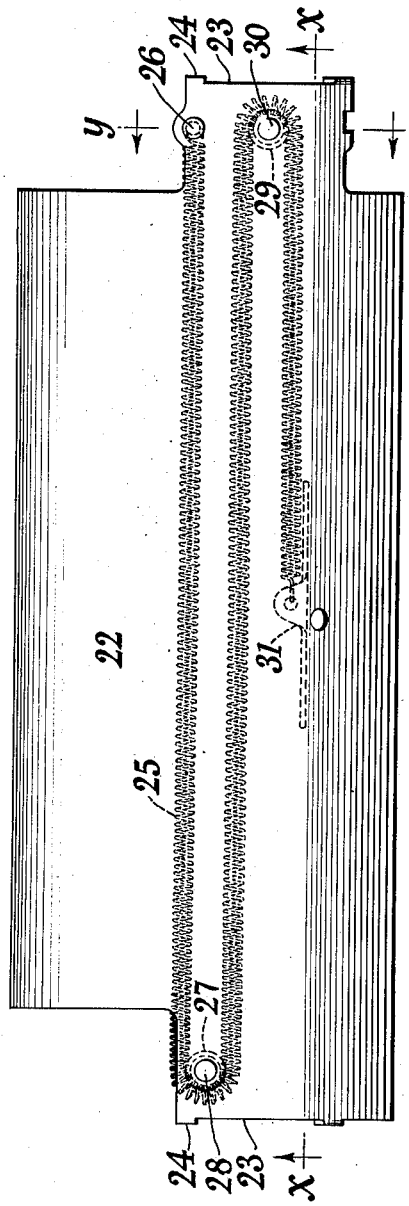
Figure 33 is a plan view, showing the tabulating motor for the paper carriage.
Figure 34:
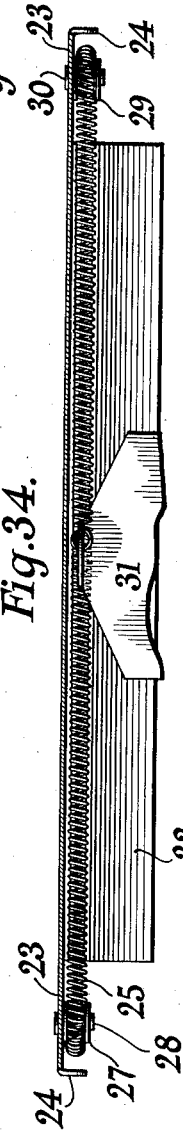
Figure 34 is a transverse sectional view on line x—x of Figure 33.
Figure 35:
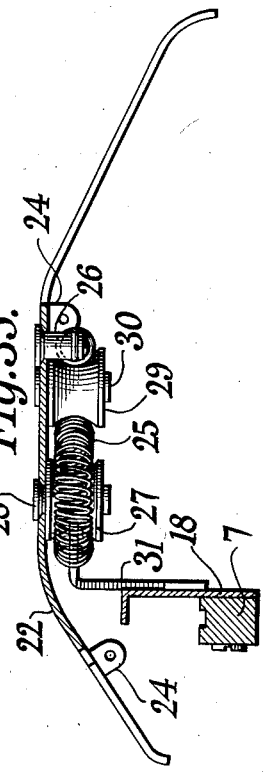
Figure 35 is a fore and aft sectional view on line y—y of Figure 33.

A convex paper shield 22, (Figs. 1, 2, 20, 31, and 33–35), located between the carriage side frames 9 and 10, is cut away at its opposite ends, (Fig. 33), to form lateral projections 23 having downturned tabs 24 formed thereon for attachment to the respective carriage side frames. The inclined front edge of the convex paper table overlies and approaches closely the inclined surface of the paper guiding grid 12, (Fig. 1), the paper shield bridging over the front rail 7, and extending rearwardly sufficiently to overhang the tie beam 13. The paper shield guides the bottom or following ends of the work sheets rearwardly, and prevents their entry into the working parts covered by the shield.

A carriage tabulating motor in the form of a long coiled spring 25, (Figs. 33–35), is fast at one end to an anchoring stud 26 depending from one of the projections 23 of the paper shield, the spring being led from the anchoring stud, lengthwise of the paper shield, and around an idle pulley 27 journaled on a stud 28 depending from the opposite projection 23, thence again lengthwise of the paper shield to pass around a second idle pulley 29 journaled on a stud 30 fixed to the under face of the paper shield, adjacent the anchor stud 26, and thence, in reverse direction, to an ear 31 fast to the stationary front track 7. (See also Fig. 20). The carriage, when shifted to the right, tensions the spring motor 25, which serves to feed the carriage to the left step by step under the control of any suitable column tabulating and/or letter spacing escapement mechanism, depending upon whether the invention is applied to machines to add and print multiple digits at a single operation, or to machines for adding and printing a single character at one operation. A shaft 32, (Figs. 1, 2 and 20), loosely journaled near its opposite ends in bearings 33 in the respective end frames 9 and 10, carries a radially extending spring-depressed plate 34 equipped with a series of stop pins 35 adapted to coact with an abutment 36 on the machine frame to hold the carriage in any of its columnar positions against the tendency of the tabulating spring 25, to advance the carriage, in much the same manner as is shown in application for United States Letters Patent, Serial No. 118,628, filed June 26, 1926, in the name of Oscar J. Sundstrand.

The foregoing construction with the exception of a few minor features, is generally old and forms no part of the present invention, except insofar as it combines with the novel features of the invention now to be set forth.

*General description*

The sheet collating feeding mechanisms are mounted on a carriage of the above-mentioned type, and include a novel collating frame equipped with means designed to facilitate the arrangement of the work sheets relatively to each other, the retention of the sheets in collated position, and the positioning of the sheaf of sheets so arranged, in such manner that the sheaf or pack may be advanced as a unit to, and arrested at a predetermined point by a single manual operation. The platen roller 5 is journaled in the forward end of the collating frame, the frame being adjustable to a collating or loading and unloading position, where it lies nearly horizontally or at a slight angle only; and to a printing position, wherein the collating frame lies at a nearly vertical slant with the platen seated in the carriage frame.

A latching means automatically becomes effective, when the collating frame is shifted from its printing to its loading and unloading position, to releasably retain the collating frame in collating position.

The collation of the work sheets is effected by the use of separately operable feed means individual to the respective sheets to position them on a work holder or carrier traversing the collating frame, and over which suitable manifolding material is led for interleaving with the work sheets.

A line locator or indicator enables the operator to arrange the work sheets with the desired writing lines thereon, accurately superposed, after which clamping means is applied to the leading ends of the collated sheets to hold them where adjusted and secure them to the work holder.

Application of the clamping means automatically releases the line indicator which thereupon returns to its idle position.

During the collation of the work sheets, the work holder lies in its home or retracted position at the upper end of the collating frame.

Figure 37:
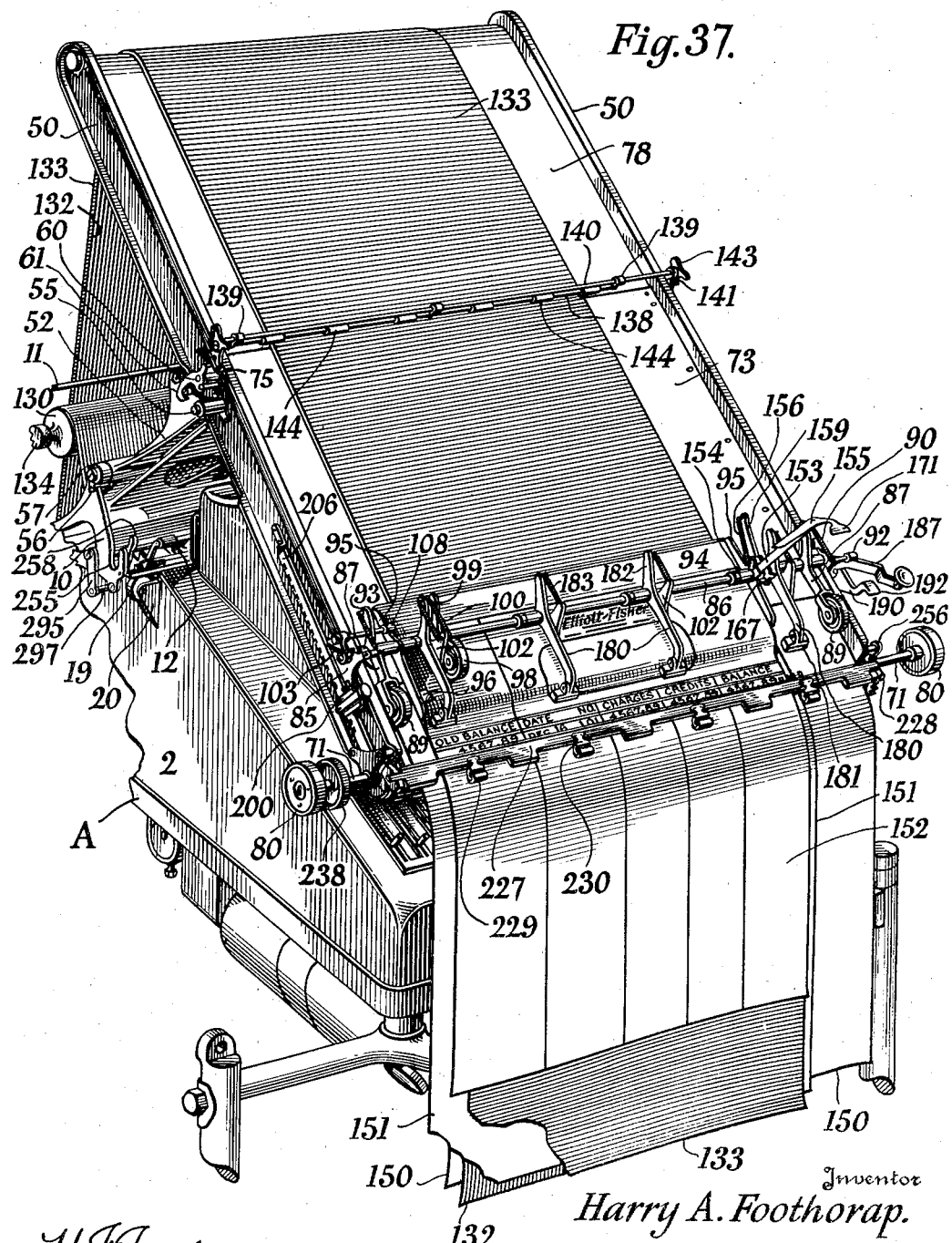
Figure 37 is a similar view, showing the truck and its sheaf of collated work sheets in their advanced positions, the sheet wrapping bail being in its cocked position over the sheaf of sheets.

Upon completion of the collating operations, the work holder and the sheaf of sheets clamped thereto are manually advanced along the collating frame until arrested by contact of the work holder with a suitably adjusted stop, at which time, the free bottom or following edges of the sheets overhang and depend in front of the platen roller, as shown in Fig. 37, so that when the bottom ends of the sheets are subsequently wrapped about the platen, the desired writing lines on the sheets will register with the printing line of the platen.

A novel wrapping means, which also serves as a paper apron, normally lies beneath the platen to engage and guide the sheets in line spacing, and hold the paper smooth, but just prior to the manually-imparted advance of the sheaf of sheets and work holder to the advanced position, the combined wrapping means and paper apron may be brought to its cocked position where it is automatically latched, with the paper apron raised laterally out of the path of the bottom ends of the sheaf of sheets.

Annular gudgeons 5a, (Fig. 17), fixed to the opposite ends of the platen roller 5 are journaled for rotation in ball races 5b secured to the front ends of the side rails 50, a spindle 71, (Figs. 3-5 also) passing through the annular gudgeons and through the platen roller 5, the opposite ends of which spindle extend some distance beyond the side rails 50 and are equipped with finger wheels 80 loosely secured thereto.

The platen and spindle are adapted for relative rotation, and the finger wheels have no control of the rotation of either the platen roller or spindle, but are provided for convenience in swinging the collating frame from the loading to the printing position and vice versa.

Simultaneously with the arrest of the work table and its sheaf of sheets in their advanced positions, a retaining means becomes effective upon the work table to hold the carriage and the sheaf of sheets in such advanced positions. The operator may now close the transverse paper apron over the advanced sheaf of sheets to confine the sheaf of sheets between its inner face and the periphery of the platen.

The operator then releases the latch which maintains the collating frame in its loading and unloading position, preparatory to manually shifting the frame to seat the platen in the carriage. Release of the cocked paper apron occurs as an incident to the release of the collating frame latch, whereupon a motor restores the paper apron to its normal position beneath the platen, and due to the confining relation of the paper apron on the free bottom ends of the sheaf of sheets, the paper apron snugly wraps the dangling ends of the sheets around the platen. Compare Figs. 37 and 38.

The platen is then manually seated in the paper carriage, and locked against accidental release.

A restoring motor energized by the operation of advancing the work table, along the collating frame, is held potentially effective by the work table retaining means. As the platen is seated in the carriage frame preparatory to printing the desired entries on the work sheets, the work table retaining means is tripped to free the restoring motor for operation.

Seating the platen 5 in the carriage frame, however, engages a ratchet on the platen with an escapement mechanism, including a pawl, mounted in the carriage frame, to restrain the restoring motor and restrict the work table to a step by step return, so long as the platen remains seated in the carriage frame.

The operator now enters and prints the desired items on the work sheets in the usual manner, the paper being automatically line spaced, in the particular form selected for the illustration of the invention, under the control of the escapement mechanism, in a manner hereinafter more fully explained.

Upon completing the entries on the sheaf of sheets, the locks which secure the platen in its seat in the carriage, are manually released, whereupon the line spacing and restoring motor, acting upon the escapement mechanism, disengages the pawl and ratchet by unseating the platen, thus freeing the work table to the full action of its motor, which immediately returns the work table and its sheaf of sheets to their original positions on the collating frame, the collating frame being manually shifted to, and latched in, its loading and unloading position, preparatory to a repetition of the foregoing operations.

Other elements of the invention will be more fully referred to hereinafter.

*Collating frame*

The collating table comprises a generally rectangular collating frame formed of flanged or channelled side bars or rails 50, 50, (Figs. 1 to 5), spaced apart sufficiently to embrace the opposite ends of the platen roller 5, and suitably stayed and braced by the flanged truss members 51 (Figs. 3 and 4) connecting the side rails.

Suitably braced flying links 52 parallel with each other in a plane transversely of the machine, are fulcrumed at their lower ends, as at 53, (Fig. 3), between ears 54 arranged in pairs near the opposite ends of the tie beam 13, the upper ends of the links being pivotally connected at 55 to the opposite side bars or rails 50 of the collating frame at points approximately midway of the ends of such side bars.

Preferably, the pivotal connections 55 between the flying links and the collating table are in the form of gudgeons projecting outwardly from the sides of the rails into bearings formed in the upper ends of the links.

This manner of supporting the collating frame permits a free and unimpeded floating action of the collating frame relatively to the carriage.

The carriage end frames 9 and 10 are provided at their upper ends with rests 56 lying in the paths of studs 57 projecting outwardly from the links, to limit the forward travel of the links, it being obvious that the rests must lie in the radius of travel of the studs 57 about their axes 53.

Extensions 58 of the carriage end frames project rearwardly and are equipped with treads 59 in the paths of the studs 57 to limit the rearward travel of the links 52.

Within these arcs of travel, the links and collating frame may assume a wide variety of relatively angular positions, and even at either limit of travel of the links, the collating table may still be adjusted at various angles to the links.

In the use of the invention, the forward rests 56 assist in determining the so-called "loading and unloading" position of the collating frame, the rear treads 59 merely affording supports for the links when the platen and collating frame are rocked rearwardly preparatory to seating the platen in the carriage, such supports assisting in providing a firm and steady base for the collating frame when rocked rearwardly.

Figure 36:
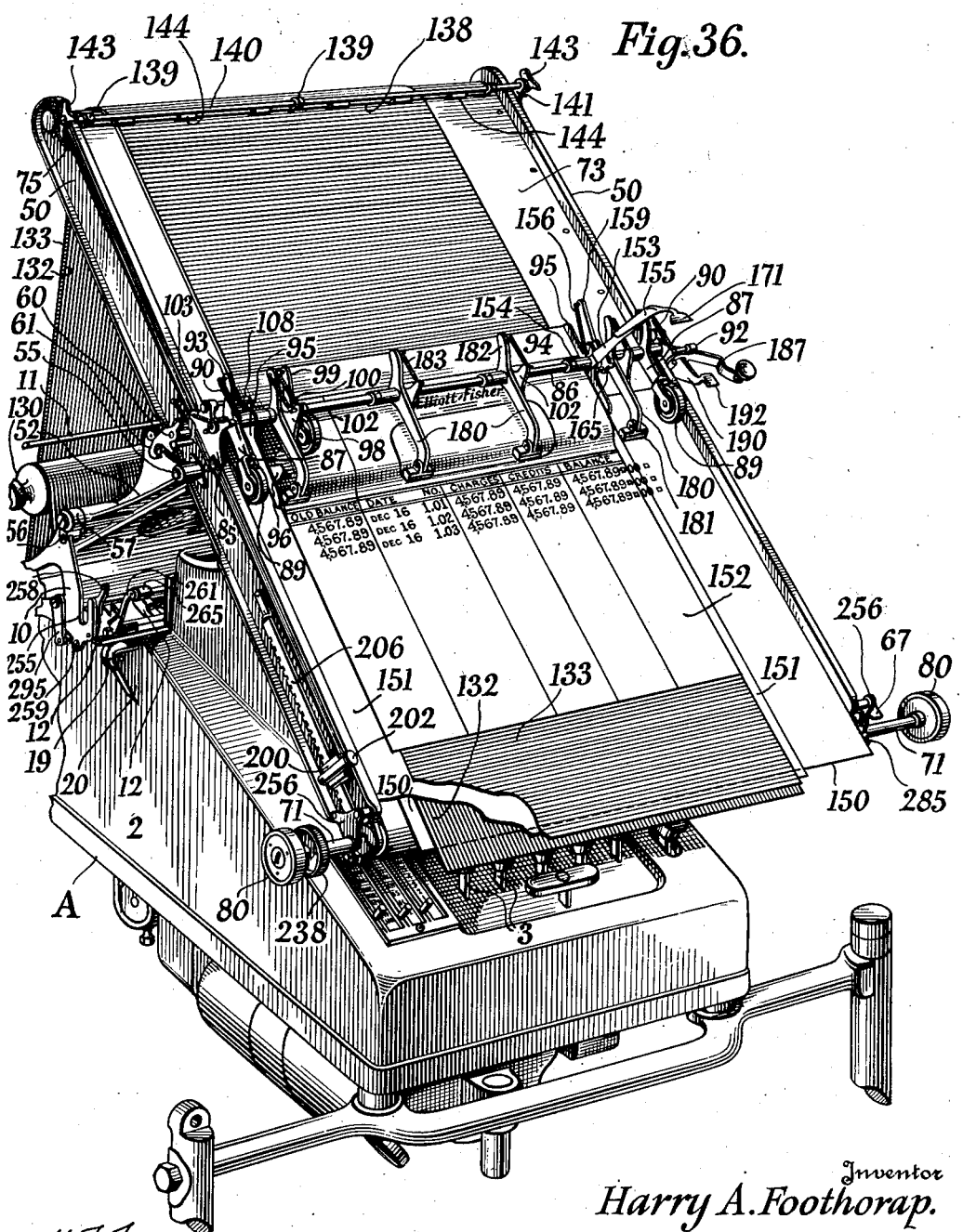
Figure 36 is a perspective view of a Sundstrand calculating machine equipped with one embodiment of my invention, showing the collating table in one of its collating positions, the work sheets having been collated and clamped to the traveling truck in its normal retracted position, preparatory to advancing the truck and sheaf of collated sheets.

The collating frame is drawn forwardly from its printing position, (Fig. 38) to its collating position, (Figs. 1 and 36). In such operation, the links 52 rock forwardly from their rearward limits of travel, and the collating frame, turning on the pivots 55, progressively assumes a position more nearly horizontal, the front end of the collating frame projecting itself out over the keyboard of the machine towards the operator to bring the work sheets within easy reach, and render undue stretching unnecessary in removing (unloading) the printed sheets, and substituting (loading) other sheets on the frame preparatory to printing thereon.

While the collating frame may be tilted on the pivots 55 at any angle, it is preferable that the collating frame be releasably fixed at a convenient angle in its loading and unloading position to enable the removal of the sheets and the substitution of others, to which end, there is provided a latching shaft 60, (Figs. 1–5, 10, 11, 13, 14, 36, and 37) extending across the collating frame at a point about midway of its length, and slightly rearward of the pivotal supports 55, the ends of the latching shaft 60 being journaled in and projecting through the side rails 50. Latches, in the form of hooks 61 fast on the protruding outer ends of the latching shaft, releasably engage studs 62 projecting from lobes 63 formed on the upper ends of the respective links 52, to lock the collating frame to the links and prevent relative movement, and to retain the collating frame in convenient position to permit the operator to remove and substitute the work sheets, and collate the sheets in the desired relations.

Springs 64 connected to the tails of the latches and anchored to the respective side rails 50, urge the latches to, and hold them in their effective positions, pins 65 lying in the paths of fingers 66 on the latches to limit the spring-urged travel of the latches in one direction.

As the floating collating frame swings forwardly with its links 52, to assume its collating position, it tilts relatively to the links 52, the forward end of the frame rising towards the horizontal, and the rear end sinking, as a result of which movement, the beveled ends of the latches 61 are brought in contact with and wipe over the studs 62, the springs 64 snapping the latches into engagement with the studs to lock the collating frame in its collating position.

In returning the collating frame to its printing position, it is necessary to disengage the latches 61 from the links 52 to restore the collating frame to its unimpeded floating condition, so that it way swing towards the vertical, relatively to the links 52 as the latter are tilted rearwardly on their lower pivot bearings 53, (Fig. 3). To enable the operator to release the latches without stretching, there is provided a bell crank finger lever 67, (Figs. 5, 10, 11, 22, and 23), pivoted at 68, preferably to the forward end of the right hand side rail 50. One arm of the bell crank is offset to clear parts of the machine, a link 69 pivotally connecting the remaining arm of the bell crank with the tail of one of the latches 61, which, it will be remembered, are fast on the latch shaft 60.

The free end of the latch-releasing bell crank is thus disposed very conveniently to the hand of the operator as he swings the collating table rearwardly, pressure on the offset arm of the bell crank operating to rock the latches 61 out of engagement with their studs 62, to free the collating table for floating action.

Stops 70 (Figs. 13 and 14) project inwardly from the lobes 63 of the links 52, into the paths of the flanged side rails 50 to limit the tilting movement of the collating frame relatively to the links in one direction, and when the latches 61 are effective, the collating frame is held substantially fixed in relation to the links, by the latches 61 and studs 62, and the stops 70.

An idler roll 72 (see also Figs. 13 and 14) is journaled between the rear ends of the side rails.

A work holder is located between and travels back and forth between, and parallel with the side rails, such work holder including a substantially rectangular flat table 73, (Figs. 3–5 and 14), extending between the channelled side rails, with its opposite side edges secured to shoes 74 (Figs. 6–8 and 32) equipped with lateral flanges 75 adjacent either end, which flanges project through and ride along slots 76 formed longitudinally of the webs of the side rails 50 throughout almost their entire lengths.

Sections or reaches 77 and 78, (Figs. 4, 13 and 14), of flexible webbing material, as rubberized fabric, for example, are securely fastened to the front and rear edges, respectively, of the work table 73, the rear reach of webbing 78 extending backwardly and around the idler roll 72, and thence forwardly beneath the table where it is connected by resilient means, as springs 79, to the free end of the front reach of webbing 77, which reach is led forwardly from the front edge of the work table 73, around the platen roll 5 and thence rearwardly towards the free edge of the rearwardly extending webbing.

In effect, this construction forms an endless belt or conveyor, having a rigid section (the work table 73) and a resilient section (the springs 79) connected by the flexible reaches 77, 78. The springs 79 prevent the formation of undue slack in the flexible connecting or fabric sections 77, 78. These fabric sections are substantially as wide as the distance between the side rails 50.

A resilient motor, as the long coiled spring 116, (Figs. 3, 4, 13, and 14), tends to drive the work table 73 to and hold it at the upper or rearward end of the collating frame, as shown in Figs. 1, 5, 14, and 36, the respective ends of the spring 116 being connected, for instance, to the free edge of the flexible connector or conveyor section 78, (Figs. 3, 4, 13, and 14), with the bight of the spring passed behind a pair of idler rolls 117 on the respective rear arms of the forward truss bar 51, and in front of another pair of idler rolls 118 on the respective front arms of the forward truss bar.

The work table is arrested in its normal upper or rear position against the influence of the draft motor 116 by contact of a block 119, (Figs. 3, 4, and 28), fastened to the under face of the work table, with an impact device mounted on the rearmost or upper truss 51, and comprising a resilient abutment 120 fast at one end to the central web of the truss 51, its free end being hook-shaped, as at 121, and lying in the path of the block 119. Associated with the abutment 120 is a cushioning means, including a pair of co-acting friction shoes 122 pivoted at their rear ends to the central web of the truss, at 123, conveniently coincident with the abutment fastening and projecting forwardly on opposite sides of, and beyond the hooked free end of the abutment. The free forward ends of the friction shoes are beveled, as at 124, and a spring 125 yielding draws the shoes towards each other to coact with the divergent sides of the block 119, to cushion its impact with the abutment 120. The contacting faces of the friction shoes 122 and block 119 may be shod with leather or other material to reduce the noise and increase the friction.

The lateral flanges 75 of the slides 74 support the form collating, and work-holding means for properly and quickly positioning the forms on the work table 73, and for retaining the forms in collated position.

Brackets 85 (Figs. 1, 2, 6–8, 10, 12 and 32) fastened to the exteriorly projecting ends of the forward flanges 75, extend upwardly outside the rails 50 to a point above the flanged upper edges of the side rails 50 of the collating frame, to support a utility shaft 86 extending between and journaled at its ends in the brackets.

This utility shaft lies above and extends across the rigid work table 73 at a point somewhat to the rear of, and parallel with, the forward edge of the table.

Collating mechanism

Collating roll supporting arms 87 are equipped at their rear ends with hubs 88 journaled on the utility shaft 86 near its opposite ends adjacent, and slightly spaced from, the inner walls of the side rails 50, the free forwardly extending ends of the arms each being forked to embrace a manually rotated collating wheel or disk 89 journaled between the tines of the respective forks. The rolls are preferably of rubber or other flexible, wear-resisting material, and have frusto-conical peripheries (Figs. 3 and 7–9), to facilitate collation of the sheets in a manner hereinafter explained. Springs 90 anchored at their forward ends to studs 91 projecting inwardly from extensions 92 of the brackets 85, are connected at their rear ends to tails 93 projecting from the collating roll supporting arms 87, to press the disks 89 downwardly against the peripheries of co-acting rolls 89a, (Figs. 6–11), journaled in forked holders 83 fastened to the bottom or under face of the work table 73 in the same longitudinal vertical planes as the forked arms 87 of the collating disks, the work table being apertured, as at 84, at points coincident with the opposed pairs of collating disks 89 and rolls 89a, to enable the disks to contact their driven rolls. The collating disks provide a ready means for feeding the work sheets quickly to their proper positions, and are easily operated by the thumb of the operator, as hereinafter explained.

An auxiliary work table 94, (Figs. 6–9 and 14) of less width and breadth than the main work table 73, is suspended above the work table 73 by depending cheek pieces 95 equipped at their upper ends with hubs journaled on the utility shaft 86, so that the auxiliary work table lies substantially parallel with the main work table and just clears the pack of work sheets thereon. An abutment post 108 (Figs. 1, 6, and 8) eccentrically mounted in the left hand shaft bracket 85, projects laterally and inwardly to a point above and in contact with the upper edge of the adjacent cheek piece 95 of the auxiliary work table 94 to control the amount of clearance between the forward edge of the auxiliary work table and the main work table 73.

By loosening the fastening 109, and rotating the post and its eccentric support, the amount of clearance may be regulated.

A paper guide lug 96, (Figs. 3 and 6–9), projecting laterally, preferably, from the left hand cheek piece 95, overhangs and just clears the plane of the auxiliary work table 94, the free forward corner of the guide lug being flared upwardly slightly, to facilitate the entry of the leading edge of a work sheet therebeneath.

A forked member 97, (Figs. 3 and 6–9), similar to but shorter than the forked arms 87, is journaled on the utility shaft 86 over and adjacent one edge of the auxiliary work table 94, to embrace a frusto-conical collating disk 98 identical with the collating disks 89, the forked member 97 having a tail 99 connected by a spring 100 to a stud 101 projecting from a bracket arm 102 fast on the utility shaft. The spring 100, identical with the springs 90, presses its collating disk 98 against the periphery of a coacting corrugated feed roll 98a (Figs. 6–9), journaled in an opening 109a formed in the suspended work table 94 beneath the collating disk 98, in lips 110 conveniently struck down from the material cut away to form the opening 109a in the auxiliary work table 94.

A spring 103, (Figs. 1–3), suitably anchored to a stud 104 projecting from one of the brackets 85, and connected to the free end of a crank arm 105 fast on the utility shaft 86, normally holds the utility shaft at one end of its rotary travel, determined by contact of a stop 106 on the crank arm, with an abutment 107 projecting from the bracket 85.

Transfer web mechanism

While individual sheets of carbon paper or similar transfer medium might be interleaved with the several work sheets or forms prior to the collating operation, it has been found much more convenient as well as economical in time and material, to provide carbon webs for this purpose and I have contrived to apply the carbon webs to this invention in such manner that the collating frame is not burdened with the weight of such material nor is its floating action obstructed in the least.

The carbon roll 130, (Figs. 1, 2, 36, and 37), having one or more webs of carbon paper coiled thereon, is journaled on a cross rod 131 mounted in, and extending between the rear extensions 58 of the right and left carriage side frames 9 and 10, beneath the overhanging rear end of the collating frame.

The free or leading ends of the carbon webs 132, 133 (two only being illustrated) are led upwardly from the carbon roll and over the rear end of the collating frame which is formed by the idler roller 72. The carbon webs lie over the rearmost flexible, connecting or fabric section 78 and over the work table 73, and thence extend forwardly over the foremost flexible section 77 for a distance to provide sufficient lengths of each carbon web to cover the manifolding forms or work sheets.

The customary guide nuts 134 adjustable along the cross rod 131, contact the ends of the carbon roll 130 to maintain the latter in line with the uncoiled lengths overlying the work table 73, the carbon roll traveling with the carriage frame and thus avoiding the imposition of transverse strains on the reach of carbon web drawn off the roll.

An additional amount of carbon web 132, 133 (see Figs. 1 and 2) is drawn from the carbon roll 130 to form a loop or bight 135 between the carbon roll and the collating frame sufficient to admit of the composite rocking actions of the collating frame and its supporting links 52 without placing longitudinal stress on the carbon webs.

A resilient inverted V-shaped clamp 136 (Figs. 1 and 2) may be sprung onto the circumference of the intercoiled carbon webs on the roll, to prevent accidental unwinding of the webs, the clamp having a seat 137 formed at its upper end to embrace the strengthening rod 11 just above and parallel with the carbon roll-supporting cross rod 131, to hold the clamp effective.

The leading ends of the carbon webs pass beneath the auxiliary work table 94 and extend forwardly therefrom a sufficient distance to cover the proof sheet and ledger sheet, as soon to be explained.

To retain the carbon webs 132, 133 in place on the collating frame, against slipping rearwardly due to the weight of the bights 135 formed in the webs, and to the shifting movements of the collating frame, I provide a retaining bar 138 (Figs. 3, 5, 13, 14, 36, and 37) extending across the work table 73 near its rear end, and journaled in crank arms 139 fast on a crank shaft 140 parallel with the retaining bar. The crank shaft, in turn, is journaled at its ends in the upper ends of brackets 141 rising from the pair of rearmost protruding flanges 75 on the work table 73. Springs 142 anchored to the respective brackets 141, are connected to the rearwardly projecting arms of bell cranks 143 fast on the crank shaft 140 to turn the latter and its depending arms 139 and retaining bar clockwise (in Fig. 5) to press the retaining bar 138 towards the work table, and hold the lengths of carbon web in place. Conveniently, the retaining bar 138 may be equipped with resilient or other friction rods 144 to contact the carbon webs.

The remaining arms of the bell cranks 143 constitute finger pieces whereby to rock the crank shaft 140 to raise the retaining bar 138 when it is desired to remove or replace the carbon webs, or to draw off a further supply of unused carbon paper, to take the place of the used lengths.

*Collating operation.*

This invention is illustrated in connection with a billing operation, as one of a large number of uses to which the invention can be put, to facilitate the preparation of bills or statements and the simultaneous entry of the amounts of such bills or statements on proof sheets and ledger sheets, respectively.

Assume the collating frame to be in its collating or "loading and unloading" position, as shown in Figs. 1, 5, and 36, with the carbon webs coiled on their roll 130, and the work table 73 in its rearward or upper most position.

To commence a billing operation, the operator will first place the proof sheet 150, holding it by its lower or following edge, with its right hand edge in contact with the inner face or web of the right hand side rail 50, whereupon he slides the leading or upper edge upwardly along the flexible webbing section 77 until the right hand corner of the proof sheet 150 enters the bite between the right hand collating disk 89 and its driven roll 89a against which the collating disk is pressed by the spring 90.

With one hand holding the proof sheet in this position, the operator, with the thumb of the other hand, will turn the collating disk 89 towards himself, which results in drawing the proof sheet between the collating disk and its roll 89a, and feeding the proof sheet 150 upwardly and rearwardly, the frusto-conical periphery of the collating disk 89 operating to press the right hand edge of the proof sheet against the inner face of the right side rail 50 and thus maintain the proof sheet in proper alinement as it is drawn upwardly by the collating disk. The tendency of the frusto-conical periphery of the collating roll to continue to shift the proof sheet to the right is overcome by the resistance offered by the side rail 50.

If the proof sheet 150 is unused, the operator will turn the collating disk only until the first writing line is brought approximately to a predetermined position indicated by a line locator 153, more fully referred to hereinafter, and if the proof sheet bears previous entries, it will be fed rearwardly until the first blank line or other desired line of writing is brought to its approximate predetermined position.

The clamp 136 (Figs. 1 and 2), having first been removed, the free ends of the carbon webs 132, 133 may be drawn off the roll 130, brought upwardly over the rear end of the collating frame, inserted beneath the retaining bar 144 while the latter is held released, and then inserted beneath the auxiliary work table 94 and a sufficient length drawn down to extend from top to bottom of the proof sheet 150, which, in the illustration herein given, is wider than the remaining sheets. (See Figs. 36–38.) The retaining bar 144 is then released, and returns to effective position to prevent displacement of the carbon webs; also after additional lengths of carbon web are drawn off to form a bight 135 of sufficient extent to admit of the movements of the collating frame without placing a strain on the carbons, the clamp 136 is re-applied to the carbon roll 130 to prevent accidental unwinding of the webs thereon.

It will be understood, however, that the forms shown in the drawings illustrate but one of a number of different applications to which the invention lends itself.

In the particular example herein set forth, the proof sheet 150 is not quite as wide as the work table 73, whereas the carbon webs are considerably narrower, and leave uncovered a substantial right hand margin on the proof sheet.

The two carbon webs 132, 133 now lie over a substantial portion of the proof sheet, their side edges lying between and clear of both the right and left hand collating disks 89.

The operator picks up the ledger sheet, and holding it by its lower edge, inserts the ledger sheet between the two carbon webs, with its left hand edge in contact with the vertical web of the left hand side rail 50, and slides the leading end of the ledger sheet upwardly until such leading end enters the bite between the left hand collating disk 89 and its roll 89a, whereupon the operator will turn the collating disk 89 with his thumb, to cause the disk and roll to draw the ledger sheet upwardly and rearwardly to its approximate predetermined position, the frusto-conical or beveled periphery of the collating disk automatically maintaining the left side edge of the ledger sheet in contact with the straight web of the left side rail 50.

The ledger sheet, being narrower than the proof sheet, but wider than the carbon webs, affords a fairly wide left hand margin, and a narrower right hand margin uncovered by the upper carbon web 133.

Lastly, the operator picks up a bill form 152, which may or may not have had previous entries made thereon, and holding the bill by its lower or following end, slides the upper or leading end rearwardly along the upper face of the suspended auxiliary work table, and beneath the guide lug 96, the left side edge of the bill form lying against the inner face of the left hand cheek piece 95, until the leading edge of the bill form enters the bite between the driving collating disk 98 and its driven roll 98a, whereupon the operator turns the collating disk 98 to cause the disk and roll to feed the bill form rearwardly to its proximate predetermined position. Obviously, the bill form, except the heading which is supported on the auxiliary work table, overlies the upper carbon web 133.

The bill form 152, is somewhat narrower than the ledger sheet 151 and exposes a considerable left hand margin of the ledger sheet as well as the right hand margin thereof.

The proper positioning of the writing lines on the respective work sheets, in collating the sheets is important because a function of this machine is to enable the operator to readily collate the sheets on a flat surface and in plain view, after which the sheaf of collated sheets is advanced a predetermined distance and wrapped around the platen, which is then seated in the carriage frame, so that the desired writing lines on the work sheets lie at the printing line of the machine without requiring further attention on the part of the operator.

To facilitate the proper location of the writing lines of the several sheets, there is provided a line finder or locater comprising an offset arm 153 (Figs. 1–3, and 10–14) having at one end a hub 154 journaled on the utility shaft 86, preferably at a point adjacent the right hand cheek piece 95 of the auxiliary work table 94, the offset arm 153 being of such length that, when in effective position, the telescopic outer end 155 of the line locater contacts the pack of sheets at a point beyond the forward edge of the auxiliary work table, and slightly beyond the forward edge of the main work table 73.

A restoring spring 156 connected at one end to a latching arm 157 projecting radially from the hub 155 at an angle to the offset line locater arm 153, is anchored at its opposite terminal, at 158, to the outer end of the longer, rearwardly extending arm 159 of a tensioning bell crank 159, 160 journaled at its angle on the utility shaft 86 in juxtaposition to the line locater hub 154. The spring 156 normally holds the line locater in a substantially vertical idle position determined by contact of the latching arm 157 with a stop pin 161 on the tensioning arm 160.

The shorter, upstanding arm 160 of the tensioning bell crank 159, 160 is broader than the rearwardly extending arm, and has an arcuate slot 162, (Figs. 10–12), formed therein to accommodate an arresting stud 163 projecting laterally from a trip finger 164, the hub of which is fast on the utility shaft 86.

A pendent latching pawl 165 pivoted intermediate its ends, at 166 to the upper end of the arm 160 of the bell crank, carries a laterally projecting tooth 167 at its forward end adapted to take over the latching arm 157 of the line locater, when the latter is swung downwardly, to hold the line locater effective, a tensioned spring 168 anchored to the root of the bell crank arm 160, and connected to the pawl 165, tending to snap the tooth over the latching arm as the latter clears the tooth when the line locater is shifted to its effective position. The spring 168, which is inferior to the return spring 156, also serves to normally press the tail of the latching pawl 165 against the stud 163 of the tripping finger, and thereby causes the pawl to act as a lever to hold the bell crank 159, 160 so that the rear end wall of the arcuate slot 162 normally contacts the limit stud 163 on the trip finger 164.

The telescopic section 155, (Figs. 3 and 12), of the line locater includes a body portion of U-shaped cross section adapted to embrace and slide along the free end of the arm 153, the section being slotted, as at 169, to accommodate the set screws 170, and permit of fine and minute adjustments of the length of the line locater, the outer end of the telescopic section curving downwardly and terminating in a transversely broadened blade 171 of sufficient extent so that, when resting on the right hand side edge of the bill 152, it will extend past such edge and over the narrow right hand margin of the slightly wider ledger sheet, to indicate the corresponding writing lines on each, as follows:

With the several work sheets 150—152 in their proximate positions, and held in such preliminary adjustment by the collating wheels 89, 89a and 98, 98a, the operator will manually swing the normally idle line locater 153, 155 forwardly and downwardly, and with it the attached latching arm 157, further tensioning the return spring 156, the cam-formed forward edge of the latching arm 157 contacting the tooth 167 of the latching pawl 165, and rocking the pawl forwardly tensioning the pawl spring 168, until the free end of the latching arm escapes the tooth 167, whereupon the spring 168 snaps the pawl rearwardly to interpose the tooth in the return path of the latching arm to hold the arm, and consequently the line locater 153, 155 in effective position with its broad blade 171 resting on the bill form 152 and extending onto the ledger sheet 151, to indicate the position to which the desired writing lines of the several sheets 150—152 are to be adjusted.

The operator then proceeds to aline the respective work sheets with the edge of the blade 171, and in so doing, turns the collating disks 89, 98, individual to the respective work sheets, with his thumb in one direction or the other to advance or retract the sheets relatively to the line locater to register the desired writing lines on the several sheets. The carbon webs 132, 133 are sufficiently narrow to clear the collating disks 89, 98, and therefore, are not affected thereby.

As above explained, the collation of the work sheets at this time, determines the lines on which the entry will be subsequently printed.

In the present instance, the adjustment of the telescopic section 155 on the arm 153 of the line locater is such that by alining the work sheets so that the tops of the printed figures of the last previous entry lie just clear of the locater blade 171, the next item to be entered will be printed on the following line, or if there be no previous entries, then the sheets are alined with the blade so that the entry to be made shall print on the first writing line.

Obviously, the telescopic section might be so adjusted on its line locater arm 153 as to require that the bottoms of the figures of the last previous entry on the work sheets be alined therewith.

Also it will be plain that the proof or audit sheet may have a large number of items previously listed thereon, and that the ledger sheet may have a different number of previously listed items, while the bill form may not have any items printed thereon.

This would necessitate the adjustment of the proof or audit sheet 150 so that its leading end lies a considerable distance to the rear of the leading end of the ledger sheet 151, while the leading end of the bill form may lie in advance of or in rear of the leading end of the ledger sheet, depending upon the width of the heading on the form, when the desired writing lines on the respective work sheets are in register, which irregular arrangement of the several sheets absolutely precludes the possibility of alining the leading ends of all sheets and inserting the pack or sheaf about the ordinary platen.

My invention, however, handles the foregoing irregular arrangement of sheets in a most expeditious and facile manner, and imposes the least work on the operator.

By arranging that the side edges of the respective sheets forming the pack or sheaf shall extend successively past the next superposed sheet, the operator is afforded a guide as to the relative positions of the several sheets, even though concealed beneath the carbon webs, and by the provision of spaced guides, (the side rails 50 and cheek piece 95) and separate adjusting means (the collating disks 89 and 96), the respective sheets may be separately positioned without affecting each other.

By the use of carbon sheets no greater in width than the narrowest work sheet, the right hand margins of the lower work sheets are not concealed.

The blade 171 could readily be widened laterally so as to project onto the lowermost or proof sheet 150, but the particular embodiment of the invention selected for illustration, is applied to a Sundstrand posting machine, which, as is well known in the art, is adapted to automatically print two ciphers on an idle handle pull after a clearing operation, to indicate that the machine is "clear" i. e., that the totalizer registers zeros and nothing else. The mechanism whereby the Sundstrand machine is caused to automatically print such clear sign forms no part of the present invention, but advantage thereof is taken, and this function of the machine is utilized as a means to enable the accurate collation of the ledger sheet 151 with respect to the proof or audit sheet 150, in the following manner.

In that form of posting herein selected for illustration in connection with the invention, the items are entered by cross tabulating operations, whereby the old balance, date, debit or charge amount, and credit amount are successively listed across the work sheets, followed by the imprint of the new balance in the extreme right hand column.

The new balance is printed by the familiar total taking operation, which clears the totalizer, and to afford proof that the totalizer was cleared during such operation, the Sundstrand machine is provided with means to automatically print a proof of clearing under control of the carriage. Thus, the carriage is arranged to automatically tabulate a short distance after printing the new balance, whereupon the machine automatically performs another clearing operation, after which the carriage automatically returns to its initial starting position to bring the first or left hand column to the printing point, the paper being automatically line spaced to present a clear area on which the next imprint, (the old balance amount) will be printed, all of which forms no part of the present invention, but is a well known function of the Sundstrand machine. Of course, these automatic operations may be manually performed.

The proof of clearing, in the present instance, is manifested by the imprint of two ciphers followed by a total sign (see Fig. 36), as a matter of course.

I have so arranged my auxiliary work table 94 axially along its supporting shaft 86, that the carriage and work collating means supported thereby, as it tabulates past the "new balance" column, will shift to such an extent that the right hand edge of the bill form 152 escapes past the point opposite those right hand type carriers 4 (Fig. 3) which print the proof of clearing characters, so that such imprint will be made at the juncture between the right hand edge of the ledger sheet 151 and the proof or audit sheet 150, with one of the characters imprinted partly on the proof sheet and partly on the ledger sheet, as shown.

It is an easy matter, when collating the ledger sheet and the proof or audit sheet, to match the complementary parts of the last printed proof of clearing sign on the respective sheets, and thus insure the registry of the last written lines on the respective sheets 150 and 151.

*Sheet clamping means*

After properly collating the sheets, interleaved with the leading ends of the carbon webs, it is necessary to maintain the sheets in collated position, during the printing operation which is to follow, and which necessitates adjustment of the collating table and platen into and out of printing position.

This result I have contrived to effect in a most facile and efficient manner.

It will be remembered that the springs 103, (Fig. 1), normally hold the utility shaft 86 at one limit of its rotation, as determined by the contact of a stop 106 with an abutment 107.

Individual clamping fingers 180, (Figs. 1, 3, 7–9, 14, and 36–38), are journaled at substantially equidistant points along the utility shaft 86 between the opposite collating disks 89.

Clamping feet 181 secured to the depending free ends of the forwardly projecting clamping fingers, clear the front edge of the auxiliary work table 94, so that the feet 181, when in idle position, lie in a plane above the front end of the work table 73. (See Figs. 10 and 14.) The clamping feet 181 conveniently comprise shoes extending transversely relatively to their respective clamping fingers 180 to which they are removably secured, the shoes being shod with a suitable cushioning material, as rubber, for instance.

Springs 183 connect the tails 182 of the clamping fingers 180 with the free ends of additional bracket arms 102 fast on the utility shaft 86 adjacent their respective clamping fingers, all the bracket arms being apertured, as at 185, (Fig. 9), to accommodate studs 186 projecting laterally from their associated clamping fingers. The springs 183 are tensioned to normally maintain the studs 186 at the lower ends of their apertures 185, as shown in dotted lines in Fig. 10, and when the utility shaft 86 is in its normal home position, the clamping fingers and their shoes extend at an angle above the work table 73 so as not to interfere with the collation of the sheets.

After the collation of the sheets, and while the line locator 153 is still latched in its effective position, the operator presses a hand lever 187 fast on one end of the utility shaft to rock the shaft counterclockwise (Figs. 5, 6, and 9) against the tension of its return spring 103.

The bracket arms 102 turn with the utility shaft 86, and through their tensioned springs 183, rock the clamping fingers to press their clamping feet downwardly upon the collated sheets, early in the operation of the shaft. Contact of the feet against the collated sheets and the front end of the work table 73 arrests the clamping fingers, and as the utility shaft continues to rotate, the bracket arms 102 increase the tensions of the clamping springs 183 to cause them to press the feet very firmly upon the collated sheets and hold them in collated position. The apertures 185 in the bracket arms 102 enable the movement of the bracket arms relatively to the studs 186 of the clamping fingers to effect this additional tensioning of the clamping springs 183. Because of their arrangement, the clamping feet have a cushioning action, and do not impact against the sheaf of collated sheets, thus reducing the liability of smudging the lower work sheets from the interleaved carbon webs.

A latch pin 188, projecting laterally from the hand lever 187, wipes past the inclined bridge of a nose 189 formed intermediate the ends of a latch lever 190 pivoted at one end, at 191, to the right hand bracket 85 of the work table and having a key 192 at its free end. A latch spring 193 connected to an ear on the latch lever 190, normally holds the latch lever at one limit of its rocking travel determined by contact of the ear with the limit stud 194. A beak 195 projecting from the latch lever contacts the limit stud to arrest the latch lever at the opposite end of its oscillatory motion.

As the hand lever 187 is depressed, the latch pin 188 cams the latch lever counterclockwise, against the tension of its spring 193, until the latch pin escapes the point of the nose 189, whereupon the spring 193 restores the latch lever to effective position with its nose 189 hooked over the latch pin 188 to hold the utility shaft 86 in the position to which it has been rocked by the hand lever 187, and thus maintain the clamping springs 183 under tension to press the clamping shoes 181 against the collated sheets.

Incidentally, the utility shaft, on its counterclockwise rotation, has further tensioned the collating roll spring 100, (Fig. 6), as well as the utility shaft return spring 103 (Fig. 1), so that at this time, these springs, augmented by the tensioned clamping spring 183, tend to return the utility shaft towards its home position.

Meanwhile, near the beginning of the rotation of the utility shaft to tension these springs and clamp the collated sheets in place, the trip finger 164 (Fig. 12) presses its stud 163 against the tail of the latching pawl 165, rocking the pawl against the tension of its spring 168, to cause its pawl tooth 167 to escape past the end of the latching arm 157 of the line locator, 153, thereby freeing the line locator to the action of its tensioned spring 156 which snaps the line locator upwardly to its normal idle position out of the way, as shown in Fig. 11.

The collated work sheets, being now clamped against accidental displacement, it is in order to advance the pack or sheaf of interspersed sheets and carbons to the position shown in Fig. 37, wherein the trailing ends of the pack depend some distance below the platen 5, preparatory to being wrapped around the platen, so that the desired writing line on the sheets of the pack will lie opposite the printing point, when the platen is thereafter seated in its carriage, without necessitating any further attention on the part of the operator.

This result is attained by positioning a stop on the collating frame at such a distance in front of a bumper or check on the endless work conveyor, when the latter is in its normal position, that the advance of the endless work conveyor with the collated sheets thereon to the point determined by the stop, will project the trailing ends of the collated sheets a sufficient distance beyond the front end of the collating frame so that when the sheets are wrapped about the platen, and the platen seated in its carriage, the desired writing line will be positioned opposite the printing point.

This distance is readily gauged, because with the work table 73 in its normal retracted position, determined by the contact of the buffer block 119 (dotted lines in Fig. 3) with the friction shoes 122 and the resilient stop 120, the last line written is co-related with the line locator 153, 155, to form a constant point relatively to which the arresting stop on the collating frame is adjusted, and such adjustment, once made, remains fixed. For example, the work table will always advance forty line spaces, say, irrespective of the depth of heading or number of previously written lines.

A convenient stop device to arrest the work table 73 and the collated sheets clamped thereto, in their fully advanced positions, includes a slide member 200 (Figs. 1, 16–19, 27, and 29), of general rectangular shape, the outer face of which has formed thereon a vertical tubular boss 201 counterbored (see Fig. 16) to accommodate a spring-pressed key 202, extending longitudinally through the boss, and provided at its lower end with a laterally projecting bit 203 guided in a transverse slot 204 formed across the lower edge of the slide member and intersecting the counterbore in the boss 201. The bit is adapted to engage and disengage notches 205 forming graduations at distances of a line space apart in the lower edge of a longitudinally ribbed stop-supporting bar 206 extending parallel with and in juxtaposition to the left hand side rail 50 of the collating frame, the slide member being longitudinally slotted along its lower edge to fit over the supporting bar. The supporting bar 206 is journaled at its opposite ends in brackets 207 projecting from the outer face of the rail 50, and carries a spacing pin 208 (Figs. 18 and 29), at its forward end adapted to contact the adjacent side rail of the collating frame to normally arrest the supporting bar 206 in a plane parallel with such rail, and thus limit the rocking action of the supporting bar under the influence of a return spring 209 interposed between the side rail 50 and the free, beveled end of a lug 210 depending from the supporting bar 206 at a point beyond the range of travel of the slide member 200.

Pressure on the head of the key 202 shifts the key downwardly against the tension of its spring 211 located between shoulders on the key and the counterbore, to disengage the bit 203 from the notch 205 in which it is seated, after which, and while holding the key depressed, the slide member 200 may be adjusted in either direction along its supporting bar 206 to the proper point, upon arriving at which, the key is released to enable the bit to enter the notch opposite which the stop is then located.

As a matter of fact, since the work table 73 always returns to a position bearing a fixed relation to the printing point of the platen, there is no particular necessity, in the line of work illustrated herein, for the provision of an adjustment for the stop device, but such adjustment may be required in other uses to which the invention may be put.

A graduated scale 212, (Fig. 27), fixed to the upper flanged edge of the side rail 50, adjacent the head of the key 202 facilitates the adjustment of the stop.

The stop member having been properly adjusted, the operator may readily advance the clamped work sheets by placing his fingers behind the utility shaft and pulling forwardly thereon, with the result that the work table 73 slides forwardly along the slots 76 provided in the side rails 50 of the collating frame, the flexible web sections 77 and 78 passing around and turning the platen 5 and the rear idle roll 72, respectively, the spring connections 79 between the free ends of the flexible webs operating to take up any slack formed in the foremost web 78 to maintain the endless conveyor taut. Also the work table, on its advance, draws with it the carbon webs 132, 133 because of the binding action of the retaining bar 138 with its friction rolls 144 on the carbon webs, and thus takes up a portion of the slack provided in the carbon webs between the carbon roll 130 and the work table. Furthermore, the endless conveyor, when thus advanced, tensions the motor spring 116, (Fig. 3) which serves, as hereinafter explained, not only to return the endless conveyor to its normal home position, but also supplies the power to automatically effect line spacing of the sheaf of sheets during printing operations.

A bumper or check device 213 (Figs. 1, 7, 8, and 32), conveniently fastened to and depending from the lateral flange 75 at the forward end of the sliding shoe 74, collides with the stop device 200, or with a cushioning member thereon, to arrest the work table 73 and collated sheets at the proper point in their advance, such cushioning device, for example, including a headed stud 214, (Fig. 17), mounted in a horizontally extending seat 215 extending through the slide member 200, a compressible spring 216 encircling the stud to normally hold the same projected rearwardly, and a button 217 fast on the protruding front end of the headed stud, operating to prevent accidental disconnection of the stud and the slide member.

To lock the work table and collated sheets in their advanced positions so as to free the hands of the operator for other uses, as in manipulating the wrapping means, releasing the collating frame latches, and swinging the collating frame to seat the platen in its carriage, I provide the slide member 200 with a spring-pressed dog 218, (Figs. 16–18, 27 and 29), pivotally mounted in a slot formed longitudinally of the upper edge of the slide, the tooth of the dog lying in the path of the hooked free end of a catch 219, (Figs. 1, 7, and 32), suitably mounted on and projecting slightly in advance of the left hand bracket 85.

As the bumper 213 of the work table 73 is about to contact its cushioned arresting stud 214, the hooked end of the catch 219 rides over and depresses the toothed end of the spring-pressed dog 218, which rises as soon as the hooked portion escapes the tooth of the dog, to interpose itself in the return path of the catch and thus lock the work table in its advanced position.

*Sheet wrapping mechanism*

Either prior to or immediately after the advance of the work table and collated sheets to their forward positions, the means for wrapping the projected trailing ends of the sheets around the platen is conditioned for operation.

This sheet wrapping means somewhat resembles a bail, and includes a pair of sectors or mutilated disks 225, (Figs. 4, 5, 15, 17, 19–24 and 27), provided with hubs 226 fast on the spindle 71 adjacent the outer faces of the bearing rings or hollow trunnions 5b of the platen.

The cross bar of the bail-like wrapping means comprises a concavo-convex paper apron and guide 227 hinged at 228, (Figs. 15, 22, and 23), to the periphery of one of the sectors 225, as the right hand sector, one edge of the cross bar 227, which is normally the rear edge, but shown as the front edge when positioned as in Fig. 15, being recessed and having squilgee rolls 229 rotatably mounted in forked holders 230 secured to the cross bar, and projecting into the spaces formed by recessing the edge of the bar.

The periphery of the opposite or left hand sector 225 is recessed, as at 231, to accommodate a lug 232 formed on the free end of the cross bar 227, any suitable means being employed to releasably connect the lug and sector, as the spring-pressed balls 233, (Fig. 17) seated in restricted apertures in the side walls of the recess 231 to enter depressions on the sides of the lug 232. A finger piece 234, (Figs. 15 and 27), projecting from the cross bar 227 facilitates the engagement and disengagement of the cross bar with its left hand sector 225.

A tensioned spring 235, (Figs. 22 and 23) anchored to the right hand side rail 50 of the collating frame, is connected at its forward end to a stud 236 on the right hand sector 225, to normally hold the combined wrapping means and paper guides 225, 227 in its lowermost position, shown in Fig. 22, wherein the mechanism serves to guide the work sheets around the platen as the sheets are line-spaced in a manner hereinafter explained, and to cause the work sheets to conform to the curvature of the platen. A stop pin 237, (Fig. 17) projects from the bearing ring 5b into the path of one side wall of the left hand sector 225, as shown in dotted lines, to arrest the combined wrapping means and paper guide in its normal position against the tension of the spring 235.

At a convenient moment, either before or just after the advance of the work table and collated sheets to the front of the collating frame, the operator will turn a disk wheel 238 fast to the protruding left hand end of the spindle 71 rearwardly (counter-clockwise in Figs. 36-38), to swing the combined paper wrapping and guide bail forwardly and upwardly through substantially a half circle, against the tension of the return spring 235, until the left hand sector 225 is arrested by contact of its opposite side wall with the stop pin 237. The combined wrapping and paper guiding bail is thus shifted from its dotted line position, shown in Fig. 17, to its full line position, or from the position shown in Fig. 22 to that shown in Fig. 23, in which latter position, it is restrained by the hooked latch 239 pivoted at the outer end of an elongated stud 240 projecting from the adjacent side rail 50, a spring 241 holding the hooked end of the latch in the path of a latching pin 242 carried on the outer face of the right hand sector 225.

Obviously, as the sector approaches its uppermost position, shown in Fig. 23, the latching pin 242 wipes beneath the hooked end of the latch 239, and as the pin passes the bill of the hooked latch, the spring 241 snaps the hook over the pin to retain the combined paper wrapping and guide means where adjusted.

The operator, with one hand, will then lift or fold back the loose trailing ends of the collated sheets from over the combined paper wrapping and guiding means, now in its elevated position preparatory to the performance of its wrapping function, and with his other hand, will grasp the finger piece 234 and pull upwardly thereon to disengage the adjacent end of the cross bar 227 from its sector, and swing the cross bar upwardly on its hinge 228, to its vertical position in which it clears the sheaf of sheets which sheaf is now released to drop back to its draped position shown in Fig. 37, after which, the operator will restore the cross bar 227 to its latched connection with the sector 225.

In this position, as illustrated in Fig. 37, the cross bar 227 with its squilgee rolls 229 will snugly press the sheaf of collated sheets against the platen.

The collating frame and sheets are now in condition to be shifted from their loading and unloading position which they have occupied up to this point, to the printing position, the only intervening operation being that of wrapping the loosely hanging trailing ends of the sheaf of sheets about the platen and directing them rearwardly so as to slide along and lie upon the paper table 22, (Fig. 31), as the platen is seated in the paper carriage, preparatory to entering items on the sheets, and this intervening operation I have contrived to perform automatically incident to shifting the collating frame to printing position, in the following manner.

It will be remembered that the collating frame is held in its loading and unloading, or collating, position by the engagement of the latches 61, (Fig. 1), with the studs 62 on the upper ends of the floating links 52.

Preparatory to shifting the collating frame to printing position, it is necessary to release these latches 61, to accomplish which, the operator may grasp one of the finger wheels 80 and with his thumb conveniently depress the thumb lever 67, (Fig. 5), connected by the link 69 with the tail of one of the latching hooks 61, to rock the latches, fast on the cross shaft 60, to their idle positions and thus free the collating frame and floating links for shifting.

A release link 243, (Figs. 22 and 23), pivoted at 244 to the tail of the hooked latch 239, is slotted at 245 to accommodate a stud 246 projecting from the thumb lever 67, the slot enabling the hooked latch to shift relatively to the thumb lever, as the latching pin 242 on the combined paper wrapping and guiding means, when shifted to its elevated position, wipes beneath the latch hook.

The thumb lever 67, when depressed, draws the link 243 downwardly to release the latch 239 and free the oscillatory paper wrapping and guiding means to the action of its return spring 235, which, thereupon, snaps the paper wrapping and guiding means back to its normal lower position, the squilgee rolls 229 and cross bar 227 wrapping the trailing ends of the collated work sheets snugly around the front half of the platen, and smoothing and flattening the sheets, as well as pressing them tautly around the platen.

The cross bar 227 is of such width that, on its arrival in its normal paper-guiding position, it tends to support the projecting bottom ends of the sheets in a horizontal position, assisted, it may be, by the hand of the operator, as the collating frame is manipulated into its seat in the paper carriage.

It being desirable to locate the platen rather exactly in its seat quickly, without resort to slow and careful handling, and to retain it in such precise position so that the printing may be uniform, and in correspondence with the printing effected on the same sheets in former operations, I have provided open ended vertical locating slots 255 (Figs. 1, 20, 31, 36 and 37) in the forward ends of the carriage side frames 9 and 10 to accommodate the opposite extended ends of the platen spindle 71 and guide the latter and the platen to the printing position.

To afford additional support for and impart rigidity to the extended ends of the spindle, I have provided bearing brackets 256, (Figs. 1, 3, 5, 17, 19 and 22), spaced apart from the forward ends of the side rails 50 of the collating frame by elongated studs 240, the extended ends of the spindle passing through bearings in these brackets.

The operator, after the release of the collating frame latches 61 and the automatic wrapping of the work sheets about the platen, pushes the collating frame rearwardly, the floating links 52 rocking backwardly on their fulcrums 53 (Fig. 3), and by a motion natural to an operator seated in front of the machine, the rear end of the collating frame rises and the front end lowers during the bodily rearward movement of the collating frame until the studs 57 (Figs. 1 and 2), intermediate the ends of the links 52 contact the treads 59 to arrest farther rearward travel of the links. Arrest of the links will cause the operator, as a matter of course, to press downwardly on the finger wheels 80. The distance between the treads 59 and the open mouths of the locating slots 255 is arranged to bear such relation to the distance between the pivots 55 of the collating frame and the spindle 71, that the spindle will be directly over the open mouths of the locating slots at the moment of arrest of the link studs 57 by the treads 59, so that the practically subconscious downward pressure exerted by the operator at that moment on the front end of the collating frame, results in the entry of the spindle into the open mouths of the locating slots 255. The spindle extensions may be provided with rotatable anti-friction sleeves, of a width corresponding to the widths of the slots 255, which also eliminates side play.

The downward pressure on the front end of the collating frame forces the spindle to the bottoms of the locating slots 255.

Figure 2:
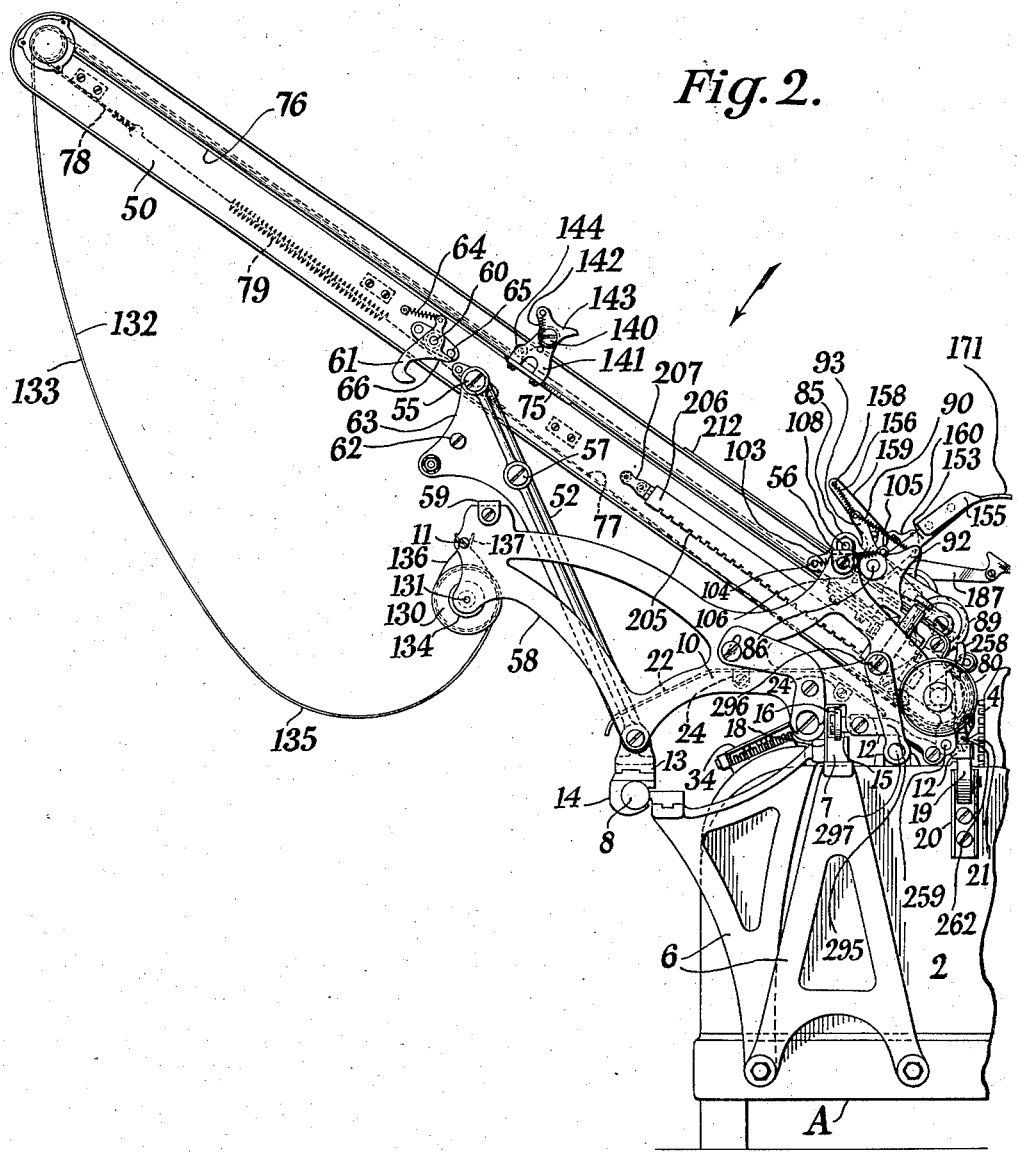
Figure 2 is a similar view, showing the table in its printing position with relation to the calculating machine.
Figure 38:
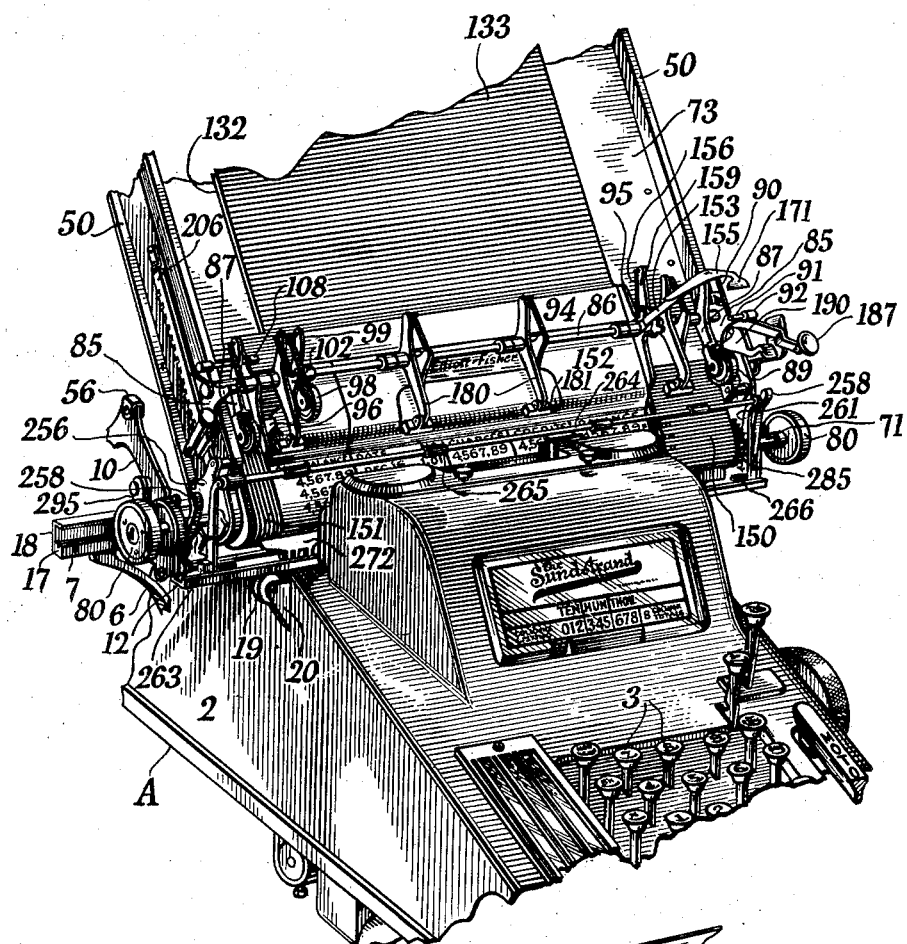
Figure 38 is a perspective view, partly broken away and showing the collating table in its printing position.
Figure 39:
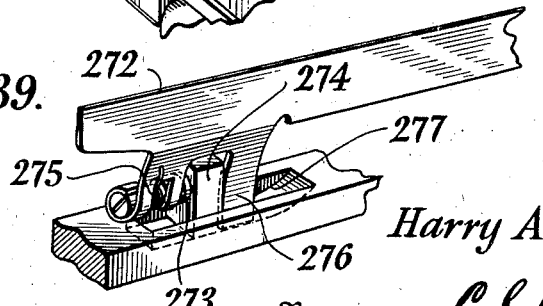
Figure 39 is an enlarged fragmentary detail in perspective of the ribbon guard plate and mounting.

The spindle, as it is pressed to the bottoms of the locating slots, contacts the upper inclined edges of the beaks 257 of manually releasable keepers 258, (Figs. 1, 20, 21 and 31), projecting upwardly from a keeper shaft 259 journaled in the front ends of the carriage side frames 9 and 10, and cams the keepers forwardly. Springs 260, (Figs. 20 and 31), restore the keepers to their normal positions as soon as the spindle escapes past the beaks, to snap the beaks over the spindle, and lock the spindle, and hence the collating frame in its printing position, as shown in Figs. 2 and 38.

The paper guide 227 with its squilgee rolls 229 engages the work sheets at a point below the printing line on the platen, and to maintain a smooth area at the printing line, as well as to confine the sheets against the platen. I provide a presser roll mechanism, including a pair of vertically extending arms 261, (Figs. 1, 20, 21, 25, 31 and 38), pivoted at their lower ends at 262 to lugs 263 projecting upwardly at opposite ends of the front bar of the grid 12. The upper ends of the supporting arms 261 are forwardly curved away from the platen, and carry a presser roll rod 264 extending across the carriage, on which are journaled in spaced relation, a series of knurled presser rolls 265, adjustable longitudinally of the rod 264.

The pivots 262 of the presser roll supporting arms 261 extend inwardly from the lugs 263, (Fig. 21), to afford mounts for coiled springs 266 anchored at their respective inner ends and connected at their outer ends to their adjacent arms 261 for the purpose of normally holding or throwing the presser rolls off from the platen. The lower end of one of the supporting arms 261, (Figs. 20, 21 and 25) is prolonged, as at 267, to enter an aperture in the front rail of the grid 12 and, by contact with a side wall of such aperture, limits the distance to which the presser rolls may be cast off.

A by-pass pawl 268, (Figs. 1, 20, 25 and 31), is pivoted on the same stud 262 with its associated supporting arm 261 alongside which it lies. A headed pin 269 on the supporting arm passes through a slot 270 formed in the by-pass pawl to limit movement of the pawl relatively to the supporting arm. The tooth of the by-pass pawl projects rearwardly into the path of the spindle 71 as it is seating in the locating slots 255, and a link spring 271 between the pawl and its supporting arm normally holds the by-pass pawl at one limit of its movement relatively to the supporting arm. The springs 271 are superior to the cast-off springs 266.

Just after the spindle 71 has cammed the keepers 258 forwardly, its prolonged ends contact with the edges of the rearwardly-projecting by-pass pawls 268 extending transversely across the path of the spindle, and due to the superior tension of the link springs 271 over the cast-off springs 266, the spindle, as it is depressed to printing position, rocks the supporting arms 261, and the pressor roll rod 264 with its presser rolls 265 counter-clockwise (Figs. 1 and 31), the presser rolls contacting the work sheets on the platen at a point above the writing lines of the sheets.

Continued depression of the platen and its spindle relatively to the presser rolls, as the platen finds its seat in the carriage side frames, causes the presser rolls to exert a slight pulling action on the sheets sufficient to tauten and smooth the sheet area between the paper guide 227 and squilgee rolls 229, and the presser rolls 265, to afford a proper printing surface, the link springs 271 yielding slightly and drawing the presser rolls firmly against the platen.

I preferably provide a ribbon guard plate 272, (Figs. 1, 31, and 39) substantially co-extensive in length with the platen 5, and having depending arms near its opposite ends, hinged at 273 to ears 274 projecting from the front bar of the paper grid 12, similarly to the presser roll device, the ribbon guard plates lying parallel with and beneath the longer presser roll rod 264.

Springs 275 tend to hold the ribbon guard plate 272 in its extreme clockwise position, as determined by contact of a projection 276 depending from the guard plate, with one wall of a recess 277 formed in the front bar of the paper grid 12, entered by the projection.

The upper edge of the ribbon guard plate 272 is beveled and normally lies tangential to the path of the platen as the latter is being adjusted to its printing position.

As the platen is seated, it brings the work sheets wrapped thereabout, against the free longitudinal beveled edge of the ribbon guard plate, and crowds the plate clockwise against the tension of its spring 275, the relative vertical movement between the platen and the ribbon guard plate enabling the beveled edge of the plate to smooth the sheets and the spring operating to press the work sheets tightly against the platen at a point just beneath the printing line to prevent slack in the sheets, and permit a firm, clear, unsmudged imprint to be made. By eliminating slack in the paper, the latter is prevented from contact with the ribbon, as the platen is seated and unseated.

*Line space control mechanism*

Finally, as the platen is settling in its seat in the paper carriage, the line space control mechanism is rendered effective.

It will be recalled that the work table 73, when advanced to the front of the collating frame from its normal retracted position, tensions the spring motor 116 (Figs. 3 and 4), and that the work table and connected parts are latched in such advanced position by engagement of the catch 219 on the table with the dog 218 on the stop device 200 mounted on the axially rotatable supporting bar 206, thus maintaining the spring motor fully tensioned.

A line spacing ratchet or scape wheel 285, (Figs. 5, 20–23, and 25), is fast to an extension of one of the annular gudgeons 5a, (the right hand one, as illustrated) of the platen 5.

As the platen settles in its seat, it brings its toothed scape wheel 285 into engagement with the tooth of a scape pawl 286 pivoted on the free end of an elongated wrist 287 projecting inwardly from the right hand carriage side frame 9. An arm 288 on the scape pawl carries a stud 289 projecting laterally into an arcuate slot 290 formed in the web 291 of a detent 292 pivoted on the wrist 287 adjacent the scape pawl.

A spring 293 connected to the tail of the scape pawl 286 normally holds the scape pawl in its extreme counter-clockwise position, (Figs. 20 and 25), determined by contact of the stud 289 with the wall at the lower end of the arcuate slot 290 in the detent.

The tail 302 of the detent 292 depends beneath the pivot 287 and is laterally flanged to form a face adapted to lie in the path of, and be contacted by a tappet 294 projecting laterally inwardly from one of a pair of hangers 295, the upper ends of which are pivoted at 296 to the respective right and left carriage end frames 9 and 10. A universal bar 297 is mounted in the depending lower ends of these hangers and is grasped between the jaws 298 of a reciprocatory member 299 well known in the Sundstrand type of machine, as shown for instance, in U. S. patents to Sundstrand, Nos. 1,537,971 and 1,708,284, issued, respectively, May 19th, 1925 and April 9, 1929.

The reciprocatory member 299 may be driven rearwardly and then returned to its forward position at each operation of the machine in the customary manner, as set forth in Sundstrand's pending application, Serial No. 118,628, hereinbefore mentioned.

A spring 300 connected to the web of the detent 292 urges the detent and the scape pawl 286 in clockwise direction (Figs. 20 and 25), to disengage the scape pawl from the ratchet 285 and engage the detent with the ratchet, but is normally prevented from so acting by contact of the laterally flanged end of the depending tail of the detent with the tappet 294 when the reciprocatory member 299 is in its home position.

Until the catch 219 and catch dog 218 are disconnected, the motor spring cannot operate to effect line spacing, or to return the work table and connected work sheets to their collating positions.

Therefore, substantially simultaneously with engagement of the ratchet 285 with its scape pawl 286, as the platen is settling in its seat, the beveled edge of the lug 210, (Figs. 16–18, 29, and 30), on the swiveled supporting bar 206, contacts the conical free end of a trip post 301 projecting inwardly from the left hand carriage frame 10 and is rocked inwardly thereby, together with the swiveled supporting bar 206 and the slide member 200 thereon in which the catch dog 218 is mounted, to disengage the catch dog from its catch 219.

Thereupon, the motor spring 116, operating through the upper reach of webbing 78, tends to return the advanced work table 73 and the collated work sheets to the upper or collating position, but is restrained by the engagement of the scape pawl 286 with the ratchet or scape wheel 285.

The printed matter can now be entered on the work sheets, by depressing the corresponding keys 3, (Fig. 38), and depressing the motor control bar 302, whereupon the motor (not shown) will actuate the machine through a cycle of operation, during which the proper types 4, (Figs. 1 and 2), will be positioned at the printing line and impressed upon the paper along the line selected by the operator when collating the sheets as heretofore explained.

As is customary in the adding machine art, the carriage may be controlled to list the items entered successively, one beneath the other, in a vertical column, which adjustment contemplates the silencing of the automatic column tabulating mechanism, and the operation of the line spacing escapement mechanism at each operation of the machine, or the controls may be set to disable the line spacing mechanism in all positions of the carriage except when printing amounts in the extreme right hand column, the column tabulating spring 25, (Figs. 33–35), being operative under control of the tabulating stop plate 34, (Figs. 1 and 2), to shift the carriage and collating frame in column spacing direction at each operation of the machine.

The line spacing escapement is controlled by the reciprocating member 299, (Figs. 20 and 25), which first rocks the universal bar 297 rearwardly, thereby freeing the detent 292 to the action of its spring 300, which rocks the detent clockwise, (Figs. 20, 25, and 26), to cause its tail 302 to follow the universal bar. The lower end wall of the arcuate slot 290 in the detent contacts the stud 289 projecting from the arm 288 of the scape pawl 286 and rocks the pawl clockwise, causing it to release the ratchet or scape wheel 285 to the action of the motor spring 116, (Fig. 3) which operates through the upper reach of webbing 78, the work table 73 and the forward reach of webbing 77 to turn the platen 5 and the ratchet.

Rotation of the platen 5 under the foregoing circumstances, is limited to a partial step of movement, by the engagement of the toothed end of the detent 292 with the teeth of the scape wheel 285, such engagement operating to lock the scape wheel, and hence the platen 5 to which it is secured, against further rotation.

Printing occurs after the reciprocatory member 299 has reached its extreme limit of rearward travel, after which, the reciprocatory member advances to its home position, rocking the universal bar 297 forwardly, in counter-clockwise direction, and with it, the detent 292.

The detent, on its counter-clockwise travel, releases the scape wheel 285, and withdraws the lower end of its arcuate slot 290 from the stud 289 of the scape pawl 286, the spring 293 of which causes the scape pawl to follow the detent in its counter-clockwise travel until the toothed end of the pawl engages the scape wheel 285.

Upon the release of the scape wheel 285 by the detent 292, the motor 116 is again free to impart an additional increment of travel to the platen 5 about which the work sheets are wrapped, the two increments of movement together constituting a full line space of travel.

Upon completing the entries on the work sheets, the operator will manually rock the keepers 258 (Fig. 31) to release the spindle 71 preparatory to unseating the platen 5 from its printing position, and rocking the collating frame to its loading and unloading position, for the purpose of removing the printed bill form and ledger sheet and substituting others therefor.

Immediately upon the release of the keepers 258, the power of the motor 116 exerted through the ratchet or scape wheel 285 against the scape pawl 286, tends to kick the platen 5 and the front end of the collating frame upwardly until the ratchet is released from the scape pawl, whereupon the motor 116 automatically actuates the endless conveyor to return the work table 73 and the sheaf of sheets 159, 151 and 152, thereto attached, to their home positions, determined by the arrest of the block 119 (Figs. 4 and 28) on the bottom of the work table, by the abutment 120 and friction shoes 122.

The operator will then disengage the spindle 71 from the locating slots 255 and draw the collating frame forwardly on its floating links 52, to the loading and unloading position shown in Figs. 1 and 36, preparatory to removing the printed bill and ledger sheet, and replacing them with others relating to the next account, in the manner hereinbefore explained.

Changes may be made in the form and arrangement of the several parts described, and certain features may be omitted, without departing from the spirit and scope of the accompanying claims.

What is claimed as new, is:

1. The combination with a machine equipped with printing devices; of a collating frame, and platen; means carried by the collating frame to enable the collation of sheets thereon, and adapted for advance along the frame, through a predetermined distance with the collated sheets, to cause the bottom ends of the sheets to depend in front of the platen; and spring-driven means rotatable circumferentially of the platen, and settable to cocked position, to confine the depending sheets when thus advanced; the cocked means, when tripped, adapted to return circumferentially of the platen to its normal position, and wrap the collated sheets about the platen.

2. The combination with a printing machine; and a carriage mounted thereon; of a collating frame; a platen carried by the collating frame, and adapted to be seated in and unseated relatively to the carriage, as the collating frame is shifted to the printing position and to the collating position, respectively; and a supporting means so connected to the carriage and the collating frame as to afford the frame an unbridled, floating motion fore and aft relatively to the machine.

3. The combination with a machine equipped with printing devices; and a carriage mounted on the machine; of a collating frame; a platen carried by the collating frame and adapted to be seated in and unseated from the carriage, as the collating frame is shifted to the printing position and to the collating position, respectively; and a support so connected to the carriage and to the frame, respectively, as to afford the frame unbridled rocking motion fore and aft of the machine on the support as a fulcrum.

4. The combination with a printing machine; and a carriage mounted thereon; of a collating frame; a platen carried by the frame and adapted to be seated in and unseated from the carriage, as the collating frame is shifted to the printing position, and to the collating position, respectively; a shiftable support so connected to the carriage and the collating frame as to afford the frame an unbridled motion fore and aft relatively to the machine; and opposed rests mounted on the carriage to limit the travel of the support relatively to the carriage.

5. The combination with a printing machine; and a carriage mounted thereon; of a collating frame; a platen carried by the frame and adapted to be seated in and unseated from the carriage, as the collating frame is shifted to the printing position and to the collating position, respectively; a support between the carriage and the collating frame to connect the frame for unbridled, floating motion fore and aft relatively to the machine; the collating frame and its support being relatively movable; and releasable means to connect the frame and support to prevent such relative motion.

6. The combination with a printing mechanism, and a carriage mounted thereon; of a collating frame; a platen carried by the frame and adapted to be seated in and unseated from the carriage, as the collating frame is shifted to the printing position and to the collating position, respectively; a pivoted support between the carriage and the collating frame, to which the frame, in turn, is pivotally connected for unbridled, floating motion fore and aft relatively to the machine; a keeper member; and a manually operable latch member to releasably engage therewith, one of which members is mounted on the support and the other on the collating frame, respectively; and means on the collating frame to release the latch member from the keeper member.

7. The combination with a printing mechanism; and a carriage mounted thereon; of a collating frame supported for swinging movement relatively to the carriage, to assume a rearwardly inclined position during the printing operation, and a substantially horizontal position for collating purposes; a platen carried by the frame and adapted to be seated in and unseated from the carriage; a support on the carriage for a supply of manifolding material, the free end of the manifolding material being led onto the frame, the manifolding material forming a bight between the supply and the frame; manually operable means to advance the collated sheets and the free end of the manifolding material a maximum distance along the table, the bight in the manifolding material being of sufficient extent to enable such advance and the swinging of the table to its printing position; and means to automatically return the advancing means with the collated sheets and free end of the manifolding material to initial position, and restore the bight.

8. The combination with a printing machine; and a carriage mounted thereon, and supporting a supply of manifolding material; of a collating frame mounted on the carriage for movement relatively thereto, to assume a rearwardly inclined position during the printing operation, and a substantially horizontal position to facilitate the collation of sheets thereon; the free end of the manifolding material extending onto the frame with a bight of material between the frame and the supply to afford slack to enable the movement of the frame relatively to the supply of manifolding material without injury to the latter.

9. The combination with a printing mechanism; and a carriage mounted thereon, and supporting a supply of manifolding material; of a collating frame mounted on the carriage for movement relatively thereto, to assume a rearwardly inclined position during the printing operation, and a substantially horizontal position to facilitate collation of work sheets thereon, the leading end of the manifolding material being led onto the frame for inter-leaving between the work sheets to be collated, with a bight of material between the frame and the supply to afford slack to enable the movement of the frame relatively to the supply of manifolding material; a work table shiftable along the frame; and means to secure the leading end of the manifolding material to the work table to preserve the relationship between the manifolding material and the frame.

10. The combination with a printing mechanism; and a carriage mounted thereon, and supporting a supply of manifolding material; of a collating frame mounted on the carriage for movement relatively thereto, to assume a rearwardly inclined position during the printing operation, and a substantially horizontal position to facilitate collation of work sheets thereon, the leading end of the manifolding material being led onto the frame for inter-leaving between the work sheets to be collated, with a bight of material between the frame and the supply to afford slack to enable the movement of the frame relatively to the supply of manifolding material; a work table shiftable along the frame; a binding device extending across and journaled on the work table for swinging movement; and resilient means mounted on the binding device and adapted to releasably pinch the leading edge of the manifolding material against the work table to preserve the relationship between the manifolding material and the frame.

11. The combination with a printing mechanism; and a carriage mounted thereon; of a collating frame mounted on the carriage for movement relatively thereto, to assume a rearwardly inclined position during the printing operation, and a substantially horizontal position to facilitate collation of work sheets thereon, the carriage supporting a supply of manifolding material independently of the collating frame; the leading end of the manifolding material being led onto the frame for interleaving with the work sheets to be collated; a work table arranged to travel along the frame; means to releasably secure the work sheets and the leading end of the manifolding material to the work table to advance therewith from their collating position; and means to effect the automatic return of the work table with the sheets from their advanced position to their collating position.

12. The combination with a printing mechanism; of a collating frame supported for movement relatively to the printing mechanism; a work table adapted to traverse the frame; a platen journaled in one end of the frame; a roll journaled near the opposite end of the frame; flexible connections secured to the upper and lower edges of the work table, respectively, and extending in opposite directions around the platen and the roll, respectively; and tension means connecting the free ends of the flexible connections to maintain them taut.

13. The combination with a printing mechanism; of a collating frame supported for movement relatively to the printing mechanism; a work table shiftable along the frame; a platen journaled in one end of the frame; a roll journaled near the opposite end of the frame; flexible connections secured to the upper and lower edges of the work table, respectively, and extending in opposite directions around the platen and the roll, respectively; and means tensioned by the work table, when advanced from its home position, to restore the work table towards its home position.

14. The combination with a printing mechanism; of a pivotally mounted collating frame supported for floating movement into and out of printing position relatively thereto; a work table adapted to traverse the frame from and to its home position on the frame, and on which the work sheets may be variously collated; clamping means traveling with the table, to releasably secure a sheaf of work sheets thereto; and a motor connected with the work table, and energized by the table when advanced from its home position, to return the table towards home position.

15. The combination with a printing mechanism; of a collating frame supported for movement into and out of printing position relatively thereto; a work table adapted to traverse the frame from and to its home position, and on which the collated sheets may be variously collated; and a resilient motor connected with the work table and the collating frame, respectively, and energized by the work table as the latter is advanced from its home position, to return the work table towards its home position.

16. The combination with a printing mechanism; of a collating frame supported for movement into and out of printing position relatively thereto; a work table of sufficient area to enable the collation of work sheets in various relations thereon, and adapted to traverse the frame from and to its home position; a resilient motor connected with the work table and with the collating frame, respectively, and energized by the work table as the latter is advanced from its home position, to return the table towards its home position; and anti-friction means for supporting the motor for movement.

17. The combination with a printing mechanism; of a collating frame supported for movement into and out of printing position relatively thereto; a work table of sufficient area to enable the collation of work sheets thereon in various relations, and shiftable from and to its home position on the frame; rollers mounted near the opposite ends of the frame; flexible draft means passing around the rollers and connected to the work holder; and a motor connected to the flexible draft means to restore the work holder to its home position.

18. The combination with a printing mechanism; of a collating frame supported for movement into and out of printing position relatively thereto; a work table of sufficient area to enable collation of work sheets in various relations thereon, and shiftable along the frame from and to its home position thereon; rollers spaced apart on the frame; flexible draft means passing around the rollers and connected to the work table; and a resilient motor having an anti-friction, supporting connection with the frame, and connected to the flexible draft means to apply its power thereto at opposite sides thereof and substantially in line therewith, to return the work table to its home position.

19. The combination with a printing mechanism; of a collating frame supported for movement into and out of printing position relatively thereto; a work table of sufficient area to enable collation of work sheets in various relations thereon, and shiftable along the frame from and to its home position thereon; rollers spaced apart on the frame; flexible draft means passing around the rollers and connected to the work table; and a resilient motor connected to the flexible draft means to apply its power thereto at opposite sides thereof and substantially in line therewith, to return the work table to its home position.

20. The combination with a printing mechanism; of a collating frame supported for movement relatively thereto; a work table shiftable along the frame from and to its home position; rollers spaced apart on the frame; flexible draft means passing around the rollers and connected to the work table; anti-friction rolls mounted on the frame in the plane of travel of the flexible draft means; and a resilient motor having a bight therein passing around the anti-friction rolls, to enable the ends of the motor to be connected to and lie substantially in line with a reach of the flexible draft means.

21. The combination with a printing mechanism; of a collating frame supported for movement into and out of printing position relatively thereto; a work table of sufficient area to enable collation of work sheets in various relations thereon, and shiftable along the frame from and to its home position thereon; rollers spaced apart on the frame; flexible draft means passing around the rollers and connected to the work table; and a resilient motor having connection with the frame and the flexible draft means, respectively, to return the work table towards its home position, one of said connections being an anti-friction connection to enable bodily movement of the motor.

22. The combination with a printing mechanism; of a collating frame supported over the printing mechanism for movement into and out of printing position relatively thereto; a work table shiftable along the frame from and to its home position; a motor to return the work table to its home position; an impact device on the work table, having divergent walls; and a spring-retracted brake device impinged by the impact device as the work table approaches its home position.

23. The combination with a printing mechanism; of a collating frame supported over the printing mechanism for movement into and out of printing position relatively thereto; a work table shiftable along the frame from and to its home position; a motor to return the work table to its home position; an impact device; and co-acting brake devices on the work table and frame, respectively, the brake device adapted to embrace the impact device as the work table approaches its home position, to frictionally arrest the work table.

24. The combination with a printing mechanism; of a collating frame supported over the printing mechanism for movement into and out of printing position relatively thereto; a work table shiftable along the frame from and to its home position; a motor to return the work table to its home position; an impact device; and a co-acting brake device, including a pair of pivoted arms adapted to embrace the impact device as the work table approaches its home position, to cushion the return of the work table.

25. The combination with a printing mechanism; of a collating frame supported over the printing mechanism for movement into and out of printing position relatively thereto; a work table shiftable along the frame from and to its home position; a motor to return the work table to its home position; and a brake mechanism to frictionally arrest the work table on its return to home position, including a buffer member; and a pair of friction shoes to accommodate and cushion the buffer member.

26. The combination with a printing mechanism; of a collating frame supported over the printing mechanism for movement into and out of printing position relatively thereto; a work table shiftable along the frame from and to its home position; a motor to return the work table to its home position; a brake mechanism to frictionally and gradually arrest the work table on its return to home position, including a buffer member, and a pair of friction shoes to accommodate the buffer member; and means to cause the friction shoes to grip the buffer member.

27. The combination with a printing mechanism; of a collating frame supported over the printing mechanism for movement into and out of printing position relatively thereto; a work table shiftable along the frame from and to its home position; a motor to return the work table to its home position; a brake mechanism to frictionally and gradually arrest the work table on its return to home position, including a buffer member; and a pair of friction shoes to accommodate the buffer member; and yielding means to normally prevent separation of the friction shoes, the buffer and friction shoes being so formed and positioned as to cause the shoes to press against the buffer with increased force the nearer the work table approaches its home position.

28. The combination with a printing mechanism; of a collating frame supported for movement relatively thereto; a work table shiftable along the frame from and to its home position thereon; means to return the work table towards its home position; adjustable means to variously arrest the work table in its advance from its home position; and means adjustable with the last-named means to latch the work table in any of its advanced positions.

29. The combination with a printing mechanism; of a collating frame supported for adjustment to collating and to printing positions, respectively, relatively to the printing mechanism; a work table shiftable along the frame from and to its home position thereon; means to automatically return the work table towards its home position; adjustable means to variously arrest the work table in any of its advanced positions; and co-acting means on the work table and arresting means, respectively, to retain the work table in a predetermined advanced position.

30. The combination with a printing mechanism; of a collating frame supported for adjustment to collating and to printing positions, respectively, relatively to the printing mechanism; a work table shiftable along the frame from and to its home position thereon; means to automatically return the work table towards its normal position; means to arrest the work table at a predetermined point in its advance, and to latch the work table at such point; and means to release the latching means incident to adjustment of the collating frame to its printing position, to free the work table-returning means for operation.

31. The combination with a printing mechanism; of a collating frame adjustable to the collating and to the printing positions, respectively, relatively to the printing mechanism; a work table shiftable along the frame from and to its home position thereon; means to automatically return the work table towards its home position; means to arrest the work table at a predetermined point in its advance, and to latch the work table at such point; a shiftable support for the latching means; and means operable upon the shiftable support to disengage the latching means from the work table incident to the adjustment of the collating frame to its printing position.

32. The combination with a printing mechanism; of a collating frame supported for adjustment to the collating and to the printing positions, respectively, relatively thereto; a work table shiftable along the frame from and to its home position thereon; means to return the work table towards its home position; means shiftable in different directions to latch the work table at various points in its advance; and means operable to shift the latch in one direction to disengage it from the work table incident to the adjustment of the collating frame to its printing position.

33. The combination with a printing mechanism; of a collating frame supported for adjustment to the collating and to the printing positions, respectively, relatively thereto; a work table shiftable along the frame from and to its home position thereon; means to return the work table towards its home position; means shiftable in different directions to latch the work table at various points in its advance; and means to free the work table to the action of its returning means, incident to the adjustment of the collating frame to its printing position.

34. The combination with a printing mechanism; of a collating frame supported for adjustment to the collating and to the printing positions, respectively, relatively thereto; a work table shiftable along the frame from and to its home position thereon; means to return the work table towards its home position; a shiftable support; a catch dog mounted on the support to retain the work table at any predetermined point in its advance; and means operable to shift the support to disengage the catch dog and work table.

35. The combination with a printing mechanism; of a collating frame supported for adjustment to the collating and to the printing positions, respectively, relatively thereto; a work table shiftable along the frame from and to its home position thereon; means to return the work table towards its home position; a shiftable support; a catch dog mounted on the support to retain the work table at any predetermined point in its advance; and a release member with which the shiftable support contacts incident to the adjustment of the collating frame to the printing position, to disengage the catch dog and work table.

36. The combination with a printing mechanism; of a collating frame supported for adjustment to the collating and to the printing positions, respectively, relatively thereto; a work table shiftable along the frame from and to its home position thereon; means to return the work table towards its home position; a shiftable support; a catch mounted on the support to retain the work table at any predetermined point in its advance; a lug on the support; and a trip post contacted by the lug incident to the adjustment of the collating frame to its printing position, to disengage the catch and work table.

37. The combination with a printing mechanism; of a collating frame supported for adjustment to the collating and to the printing positions, respectively, relatively thereto; a work table shiftable along the frame from and to its home position; means to return the work table towards its home position; means to latch the work table in any of its predetermined advanced positions; means to disengage the work table and latching means incident to the adjustment of the collating frame to its printing position; and means to control the return of the work table by its returning means towards its home position while the collating frame remains in its printing position.

38. The combination with a printing mechanism; of a collating frame shiftable from a substantially horizontal collating position to a substantially vertical printing position, and vice versa, relatively to the printing mechanism; a work table shiftable along the frame from and to a home position thereon; means to return the work table to its home position in any position of the collating frame; and means to restrict the return of the work table by its returning mechanism to a step by step movement, incident to locating the collating frame in its printing position.

39. The combination with a printing mechanism; of a collating frame shiftable to a substantially horizontal collating position and to a substantially vertical printing position, respectively, relatively to the printing mechanism; a work table shiftable along the frame from and to its home position; means to return the work table towards its home position; and means to restrict the return of the work table by the returning means, to a step-by-step movement under control of the printing mechanism, while the collating frame remains in its printing position.

40. The combination with a printing mechanism; of a collating frame adjustable relatively to the printing mechanism, to a substantially horizontal collating position and to a substantially vertical printing position, respectively; a work table shiftable along the frame from and towards its home position; means to return the work table from any advanced position towards its home position; and an escapement operable by the printing mechanism to control the return of the work table under the influence of its returning means while the collating frame is in its printing position.

41. The combination with a printing mechanism; of a collating frame supported for adjustment relatively thereto, to a collating position and to a printing position, respectively; a work table shiftable along the frame from and to its home position; means to return the work table towards its home position; and an escapement mechanism under control of the printing mechanism to regulate the return of the work table, and rendered operable incident to the adjustment of the collating frame to its printing position.

42. The combination with a printing machine; of a collating frame supported for adjustment relatively thereto, to a collating position, and to a printing position, respectively; a work table shiftable on the frame from and to its home position thereon; means to return the work table towards its home position; and a separable escapement mechanism, one element of which is connected with the work table, and another element of which is mounted on the printing machine for operation thereby, said escapement elements being relatively engageable and disengageable incident to the adjustment of the collating frame into and out of its printing position, respectively, to control the action of the work table returning means, and to free the latter for untrammelled operation, respectively.

43. The combination with a printing mechanism; and a traveling carriage; of a collating frame supported for adjustment relatively to the carriage, to a collating position, and to a printing position, respectively; a work table shiftable along the frame from and to its home position; means to return the work table towards its home position; means to latch the work table in any of its predetermined advanced positions; a separable escapement mechanism, one element of which is connected with the work table, and another element of which is mounted on the carriage for operation by the printing mechanism; said escapement elements being engageable and disengageable incident to the adjustment of the collating frame into and out of its printing position, respectively; and means to disengage the work table and its latching means incident to adjustment of the collating frame to its printing position, to free the work table-returning means for operation.

44. The combination with a printing mechanism; a collating frame supported for adjustment relatively thereto, to a collating, and to a printing position, respectively; a platen journaled in the frame; and a line spacing ratchet connected with the platen; of means carried by the frame tending to rotate the platen; and restraining means operable by the printing mechanism, to coact with the ratchet when the collating frame is adjusted to printing position, to control the rotation of the platen.

45. The combination with a printing mechanism; a collating frame supported for adjustment relatively thereto, to a collating and to a printing position, respectively; and a platen rotatably mounted on the frame; of means carried by the frame to rotate the platen; and an escapement operable by the printing mechanism, and rendered effective incident to the adjustment of the frame to its printing position, to control the rotation of the platen.

46. The combination with a printing mechanism; a collating frame supported for adjustment relatively thereto, to a collating and to a printing position, respectively; and a platen rotatably mounted on the frame; of means carried by the frame to rotate the platen; and an escapement operable by the printing mechanism and rendered effective incident to the adjustment of the frame to its printing position, to control the rotation of the platen, said escapement including a flexible scape pawl, a detent, and a ratchet connected with the platen and engageable and disengageable relatively to the pawl as the frame is adjusted into and out of its printing position.

47. The combination with a printing mechanism; and a collating frame supported for adjustment relatively thereto, into and out of its printing position wherein the work sheets carried by the frame are presented to the printing types; of a work table shiftable along the frame from and towards its home position; means to return the work table from an advanced position towards its home position; and means to control the work table return means while the frame is in its printing position; said control means being rendered ineffective incident to adjustment of the frame out of its printing position, to free the work table to the action of its return means.

48. The combination with a printing mechanism; a carriage; and a collating frame supported for adjustment relatively to the carriage, into and out of its printing position, wherein the work sheets carried by the frame are presented to the printing types; and a platen roll and an idler roll journaled in spaced relation on the frame; of a work table shiftable along the frame between the rolls, from and to its home position; oppositely extending flexible draft members connected to the work table and passing around the platen roll and idler roll, respectively; a motor operable to return the work table towards its home position; and motor-driven line-spacing mechanism mounted on the platen and the carriage, respectively, and under the joint control of the collating frame and the printing mechanism, to advance the work sheets while the collating frame is in printing position.

49. The combination with a printing mechanism; and a collating frame supported for adjustment relatively thereto, into and out of a printing position wherein the work sheets carried by the table are presented to the printing types; of a work table shiftable along the frame from and to its home position; means to return the work table and the work sheets thereto connected, from an advanced position towards the home position; and an intermittent feed device to restrain the work table to return movements of successive line-space intervals, which feed device is rendered effective incident to adjustment of the collating frame to its printing position, and is rendered ineffective to restrain the work table incident to adjustment of the collating frame out of printing position.

50. The combination with a printing mechanism; a collating frame supported for adjustment relatively thereto, from a printing position wherein the work sheets carried by the frame are presented to the printing types, to a collating position and vice versa; and a platen carried by the frame, about which the work sheets are wrapped; of a work table shiftable along the frame from and to its home position; means to releasably secure the work sheets in position on the work table, the trailing ends of the sheets extending towards the platen, the work table and work sheets adapted for advance to a predetermined point, towards the platen to enable the work sheets to depend loosely in front of the platen; and means to wrap the loosely depending sheets snugly around the platen with the desired writing lines thereon in registry with the printing line of the platen, said means being adjustable into and out of a position to confine the work sheets between itself and the platen.

51. The combination with a printing mechanism; a collating frame supported for adjustment relatively thereto, to assume a printing position wherein the work sheets carried by the frame are presented to the printing types, and a collating position; and a platen journaled in the frame; of a work table shiftable along the frame from and to its home position; means to releasably secure a sheaf of work sheets on the work table, the trailing ends of the sheets extending towards the front of the collating frame; means to arrest the advance of the work table and work sheets at a predetermined point, with the trailing ends of the work sheets depending loosely in front of the platen; and means to wrap the loosely depending sheets around the platen with the desired writing lines thereon in registry with the printing line on the platen, preparatory to adjustment of the collating frame to its printing position.

52. The combination with a printing mechanism; a collating frame supported for adjustment relatively thereto to assume a printing position wherein the work sheets carried by the table are presented to the printing types, and a collating position; and a platen at the forward end of the table; of a work table shiftable along the frame from and to its home position; means to releasably secure a sheaf of work sheets on the work table, the trailing ends of the sheets extending towards the platen, the work table and work sheets adapted for advance to a predetermined point, towards the platen, to enable the work sheets to depend loosely in front of the platen with the desired writing lines thereon in position to register with the printing line on the platen when the sheets are fitted around the platen; and a wrapping member movable circumferentially around the platen to wrap the depending sheets snugly around the platen.

53. The combination with a printing mechanism; a collating frame supported for adjustment relatively thereto between a printing position, wherein the work sheets carried by the frame are presented to the printing types, and a collating position; and a platen at the forward end of the frame; of a work table shiftable along the frame from and to its home position; means to releasably secure a sheaf of work sheets on the work table, the trailing ends of the sheets extending towards the front of the collating frame, the work table and work sheets adapted for advance to a predetermined point towards the front of the frame, to cause the work sheets to depend loosely in front of the platen; and a wrapping member movable circumferentially around the platen from front to rear thereof, to fit the depending sheets snugly about the platen with the desired writing lines thereon in registry with the printing line on the platen, and to take up slack in the sheets.

54. The combination with a printing mechanism; a collating frame supported for adjustment relatively thereto between a printing position, wherein the work sheets carried by the frame are presented to the printing types, and a collating position; and a platen at the forward end of the frame; of a work table shiftable along the frame from and to its home position; means to releasably secure a sheaf of work sheets on the work table, the sheets extending towards the front of the collating frame, the work table and work sheets adapted for advance to a predetermined point, towards the front of the frame, to enable the work sheets to depend loosely in front of the platen; and a hinged member bodily movable circumferentially around the platen to fit the depending sheets snugly thereabout.

55. The combination with a printing mechanism; a collating frame supported for adjustment relatively thereto between a printing position wherein the work sheets carried by the frame are presented to the printing types, and a collating position; and a platen at the forward end of the frame; of a work table shiftable along the frame from and to its home position; means to releasably secure a sheaf of work sheets on the work table, the sheets extending towards the front of the collating frame; the work table and work sheets adapted for advance to a predetermined point, towards the front of the frame, to enable the work sheets to depend loosely in front of the platen; and a member supported to travel concentrically of, and relatively to, the platen in frictional contact with the depending sheets, to wrap the latter snugly about the platen.

56. The combination with a printing mechanism; a collating frame supported for adjustment relatively thereto between a printing position, wherein the work sheets carried by the frame are presented to the printing types, and a collating position; and a platen at the forward end of the frame; of a work table shiftable along the frame from and to its home position; means to releasably secure a sheaf of work sheets on the work table, the sheets extending towards the front of the collating frame; the work table and work sheets adapted for advance to a predetermined point, towards the front of the frame, to enable the work sheets to depend loosely in front of the platen; a shiftable paper apron normally in position beneath the platen when the latter is in printing position, to guide the work around the platen, and shiftable circumferentially of the platen to a point above the platen, when the frame is in collating position, to confine the work sheets closely against the platen; and means to restore the paper apron to its normal position while the work sheets depend in front of the platen, to wrap the work sheets snugly about the platen.

57. The combination with a printing mechanism; a collating frame supported for adjustment relatively thereto between a printing position, wherein the work sheets carried by the frame are presented to the printing types, and a collating position; and a platen at the forward end of the frame; of a work table shiftable along the frame from and to its home position; means to releasably secure a sheaf of work sheets on the work table, the sheets extending towards the front of the collating frame; the work table and work sheets adapted for advance to a predetermined point towards the front of the table, to enable the work sheets to depend loosely in front of the platen; a member bodily movable circumferentially around the platen to fit the depending sheets snugly about the platen; and squilgee or pressure feed rolls mounted in the wrapping member to contact the sheaf of sheets and assist in smoothing the work sheets around the platen.

58. The combination with a printing mechanism; a collating frame supported for adjustment relatively thereto between a printing position, wherein the work sheets carried by the table are presented to the printing types, and a collating position; and a platen at the forward end of the frame; of a work table shiftable along the frame from and to its home position; means to releasably secure a sheaf of work sheets on the work table, the sheets extending towards the front of the collating frame, the work table and work sheets adapted for advance to a predetermined point, towards the front of the frame, to enable the work sheets to depend loosely in front of the platen; and means to automatically fit the sheaf of work sheets snugly about the platen.

59. The combination with a printing mechanism; a collating frame supported for adjustment relatively thereto between a printing position, wherein the work sheets carried by the frame are presented to the printing types, and a collating position; and a platen at the forward end of the frame; of a work table shiftable along the frame from and to its home position; means to releasably secure a sheaf of work sheets on the work table, the sheets extending towards the front of the collating frame; the work table and work sheets adapted for advance to a predetermined point, towards the front of the frame; to enable the work sheets to depend loosely in front of the platen; means shiftable around the platen to automatically fit the sheaf of work sheets snugly about the platen; a catch to retain the shiftable wrapping means in potentially operative position; and a manually operable member to free the wrapping means for operation.

60. The combination with a printing mechanism; a collating frame supported for adjustment relatively thereto between a printing position, wherein the work sheets carried by the frame are presented to the printing types, and a collating position; and a platen at the forward end of the frame; of a work table shiftable along the frame from and to its home position; means to releasably secure a sheaf of work sheets on the work table, the sheets extending towards the front of the collating frame, the work table and work sheets adapted for advance to a predetermined point towards the front of the frame, to enable the work sheets to depend loosely in front of the platen; a motor driven wrapping means shiftable around the platen to fit the sheaf of sheets snugly about the platen; means to retain the collating frame in collating position; separate means to retain the shiftable wrapping means in potentially effective position; and a single manually operable member to release both retaining means.

61. The combination with a printing mechanism; a collating frame supported for adjustment relatively thereto between a printing position, wherein the work sheets carried by the frame are presented to the printing types, and a collating position; and a platen at the forward end of the frame; of a work table shiftable along the frame from and to its home position; means to releasably secure a sheaf of work sheets on the work table, the sheets extending towards the front of the collating frame; the work table and work sheets adapted for advance to a predetermined point towards the front of the frame, to enable the work sheets to depend loosely in front of the platen; and wrapping means to fit the sheaf of sheets snugly about the platen, including a paper apron normally lying beneath the platen to guide the work sheets therearound; swinging supports to enable the paper apron to travel bodily circumferentially of the platen to a position above the platen; means to restore the paper apron to its normal position; means to releasably retain the paper apron in its upper position; a releasable connection between the paper apron and one of its brackets to enable the apron to take over the sheaf of sheets; and means to free the paper apron to the action of its restoring means.

62. In a collating frame having a platen at one end, the combination with a work table shiftable along the frame from and to its home position; and means to attach a sheaf of work sheets to the work table, which sheets, in the advanced position of the work table, depend in front of the platen; of wrapping means shiftable about the platen and adapted to confine the work sheets, and rock concentrically of the platen to fit the sheets snugly about the platen.

63. In a collating frame having a platen at one end, the combination with a work table shiftable along the frame from and to its home position; and means to attach a sheaf of work sheets to the work table, which sheets, in the advanced position of the work table, depend in front of the platen; of a rotatable device constituting a combined paper apron and wrapping means normally arranged beneath the platen to guide the work sheets as they advance in line-spacing direction, and shiftable to a position above the platen to take over the depending sheaf of sheets; and means to restore the rotatable device to its normal position.

64. In a collating frame, the combination with a work table shiftable along the frame from and to its home position; and means to attach a sheaf of work sheets to the work table to travel therewith; of a shaft journaled in the forward end of the collating frame; a platen journaled on the shaft, the sheaf of work sheets adapted to depend in front of the platen in the advanced position of the work table; supports fast with the shaft at opposite ends of the platen; a combined paper apron and wrapping means hinged to one support, and releasably connected to the other support, and normally lying beneath the platen to guide the work sheets in line-spacing direction; means to turn the shaft to position the paper apron and wrapping means above the platen, the paper apron adapted to confine the sheaf of sheets; and means to restore the combined paper apron and wrapping means to normal position.

65. The combination with a printing mechanism; a carriage having a platen seat; a collating frame adjustable into and out of printing position relatively to the printing mechanism; and a platen journaled in the collating frame to shift therewith into and out of its seat in the carriage; of pressure roll arms mounted on the carriage; pressure rolls on the arms; means to shift the pressure roll arms away from the platen as the latter is unseated; and means connected with the pressure roll arms, and adapted to lie in the path of the collating frame as the latter and its platen are shifted to printing position, to move the pressure rolls against the platen.

66. The combination with a printing mechanism; a carriage having a platen seat; a collating frame adjustable into and out of printing position relatively to the printing mechanism; and a platen journaled in the collating frame to shift therewith into and out of its seat in the carriage; of pressure roll arms mounted on the carriage; pressure rolls on the arms; means to shift the pressure roll arms away from the platen as the latter is unseated; pivoted pawls associated with the pressure roll arms; resilient links connecting the pawls and arms, the pawls adapted to lie in the path of the collating frame as it is adjusted to seat the platen in the carriage, and be contacted by the collating frame to move the pressure rolls towards and press them against the platen.

67. The combination with a printing mechanism; and a collating frame having guides for the sheets to be collated, and supported for adjustment into and out of printing position; of a work table shiftable along the frame from and to its home position; clamping means mounted to travel with the table to hold the sheets in their collated positions; and means to assist in the collation of the sheets by feeding the sheets towards one of the guides on the table.

68. The combination with a printing mechanism, and a collating frame having guides against which the side edges of the sheets bear, the frame being supported for adjustment to a collating position and to a printing position, respectively; of a work table shiftable on the frame from and to its home position; clamping means mounted to travel with the work table, to hold the sheets in their collated positions; and means to assist in the collation of the sheets, including a pair of opposed rolls adapted to grip a work sheet therebetween, one of the rolls having a beveled periphery; and means to maintain yielding contact between the opposed rolls, whereby rotation in one direction or the other of the rolls will feed the sheet backwardly or forwardly and towards or away from the appropriate sheet guide.

69. The combination with a printing mechanism; and a collating frame having guides against which the side edges of the sheets bear, the frame being supported for adjustment to a collating position and to a printing position, respectively; of a work table shiftable on the frame from and to its home position; a shaft rotatably mounted above and traveling with the work table; sheet clamping fingers journaled on the shaft; arms fast on the shaft; resilient links connecting the arms and clamping fingers; means to normally hold the shaft at one limit of its oscillatory travel to retain the clamping fingers ineffective; and means to rock the shaft and arms relatively to the clamping fingers to tension the resilient links which press the clamping fingers against the work sheets on the work table.

70. In a collating device, the combination with a frame; and a work table shiftable on the frame from and to its home position; of means to releasably clamp the work sheets on the work table, after collating, including normally idle clamping fingers adapted to press the collated sheets against the work table; rotatable arms having lost motion connections with their respective clamping fingers; resilient links between the arms and clamping fingers; and means to rock the arms relatively to the fingers to tension the links to cause them to press the clamping fingers upon the collated sheets.

71. In a collating device, the combination with a frame; and a work table shiftable on the frame from and to its home position; of means to releasably clamp the work sheets on the work table, after collating, including a rotatable shaft traveling with the table; a clamping finger journaled on the shaft; an arm fast on the shaft and having a lost motion connection with the clamping finger; a resilient connection between the arm and clamping finger; means operable on the shaft and arm to rock the latter in one direction to cause the arm to contact with and shift the clamping finger to its ineffective position; means to rotate the shaft and arm in the opposite direction, relatively to the clamping finger to free the clamping finger and tension the resilient connection to press the finger against the work sheets; and latching means to releasably hold the arm against return.

72. In a collating device, the combination with a frame; and a work table shiftable on the frame from and to its home position; of means to releasably clamp the work sheets on the work table, after collating, including normally idle clamping fingers adapted to press the collated sheets against the work table; rotatable arms having lost motion connections with their respective clamping fingers; resilient links between the arms and clamping fingers; and means to rock the arms relatively to the fingers to tension the links to cause them to press the clamping fingers upon the collated sheets; a line locator journaled on the shaft; means to restore the line locator to idle position; means to releasably detain the line locator in its effective position against the tendency of its restoring means; and means to trip the line locator detaining means incident to shifting the clamping fingers to their effective positions.

73. The combination with a collating frame, having a work table; of normally idle clamping means to hold the work sheets in collated position on the work table; a normally idle line locator; means to restore the line locator from its effective position to its idle position; means to releasably detain the line locator in its effective position; and means to shift the clamping means to effective position, and incident thereto, release the line locator-detaining means to free the line locator to the action of its restoring means.

74. In a collating device, the combination with a frame; and a work table shiftable along the frame from and to its home position; and having guide flanges for the work sheets; of a shaft journaled above and extending across the work table; an auxiliary work table depending from the shaft to lie in substantial parallelism with and spaced apart from the work table; the auxiliary work table having a paper guiding flange; normally idle presser feet mounted on the shaft and extending forwardly to clear the auxiliary work table; and means to shift the presser feet to effective position to retain the work sheets superposed on the main and auxiliary work tables in collated position.

75. The combination with a printing mechanism; of a collating frame shiftable relatively to the printing mechanism, between a substantially horizontal collating position and a substantially vertical printing position; a work table shiftable along the frame on which the work sheets may be variously collated; clamping means to releasably secure the sheets, when in their variously adjusted positions, to the work table during the printing operation; a motor to drive the work table in one direction; and escapement mechanism to restrict the motor-driven travel of the work table to a step by step movement as long as the collating frame remains in its printing position.

76. The combination with a printing mechanism; of a collating frame shiftable relatively to the printing mechanism, between a substantially horizontal collating position and a substantially vertical printing position; a work table shiftable along the frame on which the work sheets may be variously collated; clamping means to releasably secure the sheets, when in their variously adjusted positions, to the work table during the printing operation; a motor to drive the work table in one direction; and escapement mechanism to restrict the motor-driven travel of the work table to a step by step movement as long as the collating frame remains in its printing position, and effective to project the work table and work in an uninterrupted movement to one limit of travel, upon displacement of the collating frame from its printing position; and a stop to arrest the work table and work at such limit.

HARRY A. FOOTHORAP.